US012030306B2

(12) United States Patent
Hamada

(10) Patent No.: US 12,030,306 B2
(45) Date of Patent: Jul. 9, 2024

(54) ACCOMMODATING DEVICE AND RECORDING DEVICE

(71) Applicant: SEIKO EPSON CORPORATION, Tokyo (JP)

(72) Inventor: Nobuhiko Hamada, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 370 days.

(21) Appl. No.: 17/304,036

(22) Filed: Jun. 14, 2021

(65) Prior Publication Data

US 2021/0394538 A1 Dec. 23, 2021

(30) Foreign Application Priority Data

Jun. 17, 2020 (JP) ................................. 2020-104590

(51) Int. Cl.
*B41J 13/10* (2006.01)
*B65H 16/00* (2006.01)

(52) U.S. Cl.
CPC .......... *B41J 13/106* (2013.01); *B65H 16/005* (2013.01)

(58) Field of Classification Search
CPC ............................. B41J 13/106; B65H 16/005
See application file for complete search history.

(56) References Cited

U.S. PATENT DOCUMENTS 9,002,257 B2 * 4/2015 Saiga ..................... B41J 15/046 399/405
10,023,418 B2 * 7/2018 Asai ....................... B65H 31/20
2010/0111584 A1 * 5/2010 Shiohara ................ B41J 13/106 399/405

FOREIGN PATENT DOCUMENTS

JP 2002-211821 A 7/2002

* cited by examiner

*Primary Examiner* — Sharon Polk
(74) *Attorney, Agent, or Firm* — WORKMAN NYDEGGER

(57) ABSTRACT

A stacker unit includes a sheet member having flexibility and is configured to receive in the sheet member a sheet having a sheet shape and discharged from a discharge port in a discharge direction. The sheet member includes a contact portion with which the sheet comes into contact. In a width direction intersecting the discharge direction, at least one end portion of the contact portion is positioned inward of at least one end portion of the sheet reaching the contact portion.

17 Claims, 15 Drawing Sheets

ACCOMMODATING DEVICE AND RECORDING DEVICE

The present application is based on and claims priority from JP Application Serial Number 2020-404590, filed Jun. 17, 2020, the disclosure of which is hereby incorporated by reference herein in its entirety.

BACKGROUND

1. Technical Field

The present disclosure relates to an accommodating device and a recording device.

2. Related Art

A receiving device of a recording medium described in JP-A-2002-211821 is constituted by a sheet member having flexibility, and is configured to receive a discharged recording medium by the sheet member. A discharge film is attached to a receiving port of the sheet member that receives the recording medium.

In the configuration of JP-A-2002-211821, the sheet member and the discharge film are separate bodies, requiring management of not only a state of the sheet member but a state of the discharge film as well, making he handling he device complex. Furthermore, because the recording medium and the discharge film come into contact with each other, depending on the material of the recording medium, a friction force caused by contact between the recording medium and the discharge film increases, which may cause the recording medium to snag on the discharge film.

SUMMARY

To solve the problems described above, an accommodating device according to the present disclosure is an accommodating device provided with a receiving member having flexibility, the accommodating device being configured to receive in the receiving member a medium having a sheet shape and discharged from a discharge unit in a discharge direction. The receiving member includes a contact portion with which the medium comes into contact and, in a width direction intersecting the discharge direction, at least one end portion of the contact portion is positioned inward of at least one end portion of the medium reaching the contact portion.

DESCRIPTION OF EXEMPLARY EMBODIMENTS

Figure 1:
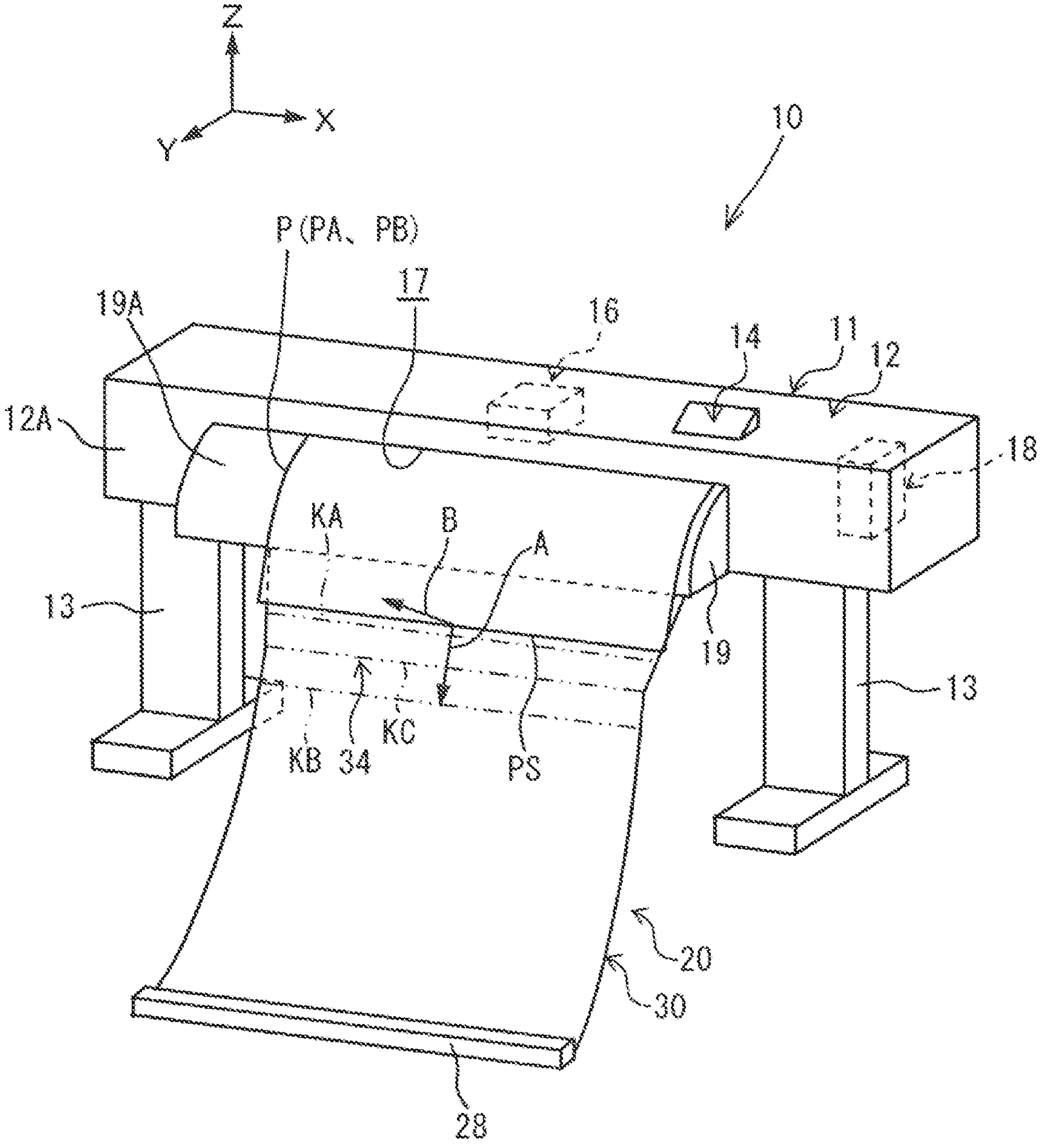
FIG. 1 is a perspective view of a printer according to a first exemplary embodiment when viewed from the front.

Hereinafter, first to eighteenth aspects of the present disclosure will be schematically described.

An accommodating device according to the present disclosure for solving the problems described above is an accommodating device provided with a receiving member having flexibility, the accommodating device being configured to receive: in the receiving member a medium having a sheet shape and discharged from a discharge unit in a discharge direction. The receiving member includes a contact portion with the medium comes into contact and, in a width direction intersecting the discharge direction, at east one end portion of the contact portion is positioned inward of at least one end portion of the medium reaching the contact portion.

According to this aspect, only the state of the receiving member need be managed, and thus the handling of the device is simplified. Furthermore, at east one end portion of the contact portion is positioned inward in the width direction of least one end portion of the medium reaching the contact portion. Thus, when the medium discharged from the discharge unit reaches the receiving member, at least one e portion of the medium is in a non-contact state with the receiving member, making it possible: to suppress the snagging of the medium on the receiving member.

In an accommodating device according to a second aspect, in the first aspect, the contact portion is an area of the receiving member with which the medium comes into contact first.

According to this aspect, when the medium discharged from the discharge unit reaches the receiving member, a tip portion of the medium comes into contact with the contact portion first. Thus, an end portion of the tip portion of the medium in the width direction that is susceptible to being snagged is in a non-contact state with the receiving member, making it possible to suppress the snagging of the medium on the receiving member.

In an accommodating device according to a third aspect, in the first aspect or the second aspect, both end portions of the contact portion in the width direction are positioned inward of both end portions of the medium in the width direction.

According to this aspect, when the medium reaches the receiving member, both end portions of the medium in the width direction are in a non-contact state with the receiving member, making it possible to further suppress the snagging of the medium on the receiving member compared to a configuration in which only one end portion of the medium is in a non-contact state.

In an accommodating device according to a fourth aspect, in any one of the first aspect to the third aspect, the contact portion is obliquely disposed with a downstream portion in the discharge direction positioned below an upstream portion in the vertical direction when viewed from the width direction.

According to this aspect, the tip portion of the medium, which is in a state of hanging downward under its own weight, comes into contact with the contact portion obliquely disposed, thereby suppressing a reaction force from the contact portion that acts on the tip portion of the medium, and thus making it possible suppress deformation of the tip portion of the medium compared to a configuration in which the contact portion is horizontally disposed.

In an accommodating device according to a fifth aspect, in any one of the first aspect to the fourth aspect, an end portion of the receiving member in the width direction and downstream of the contact portion in the discharge direction is positioned outward of an end portion of the medium in the width direction.

According to this aspect, a length of the receiving member in the width direction in an area downstream of the contact portion is longer than a length of the medium in the width direction. Thus, the medium loved downstream from the contact portion in the discharge direction is supported by the receiving member, making it possible to stabilize a posture of the medium received by the receiving member.

In an accommodating device according to sixth aspect, in any one of the first aspect to fifth aspect, an oblique side portion including a downstream portion in the discharge direction positioned outward of a position of the contact portion in the width direction is formed at an end portion of the receiving member in the width direction.

According to this aspect, there is no step portion at the end portion of the receiving member in the width direction, making it possible to move the medium in the discharge direction after the medium is brought into contact with the contact portion.

In an accommodating device according to a seventh aspect, in any one of the first aspect to the sixth aspect, the receiving member is provided with an adjustment unit configured to adjust a length of the contact portion in the width direction.

According to this aspect, even in a case in which the medium having different lengths in the width direction is used, a length of the contact portion in the width direction is adjusted to match a length of the used medium in the width direction e adjustment unit, thereby suppressing contact between the end portion of the medium and the receiving member and thus making it possible to suppress the snagging of the medium.

In an accommodating device according to an eighth aspect, in the seventh aspect, the adjustment unit is configured to adjust a length of the contact portion in the width direction, thereby positioning both end portions of the contact portion in the width direction inward of both end portions of the medium in the width direction.

According to this aspect, in a case in which the medium having different lengths in the width direction is used, when the medium reaches the receiving member, both end portions of the medium in the width direction are in a non-contact state with the receiving member, making it possible to further suppress the snagging of the medium on the receiving member.

In an accommodating device according to a ninth aspect, in the seventh aspect or the eighth aspect, the adjustment unit includes a notch portion cut from an end portion of the receiving member in the width direction toward a central portion, a first adjustment unit positioned upstream of the notch portion in the discharge direction in the receiving member, a second adjustment unit positioned downstream of the notch portion in the discharge direction in the receiving member, and a holding unit configured to hold the first adjustment unit and the second adjustment unit in a retracted state away from the medium.

According to this aspect, when the length of the contact portion in the width direction is not adjusted, the first adjustment unit and the second adjustment unit are aligned in the discharge direction and function as a portion of the contact portion.

On the other hand, when the length of he contact portion of the width direction is adjusted, the holding unit holds the first adjustment unit and the second adjustment unit, bringing the first adjustment unit and the second adjustment unit into a retracted state away from the medium, and shortening the length of the contact portion in the width direction. In this way, the length of the contact portion in the width direction can be adjusted by the presence or absence of the holding of the first adjustment unit and the second adjustment unit by the holding unit, and thus adjustment can be made using a smaller number of components.

In an accommodating device according to a tenth aspect, in the ninth aspect, in the retracted state, a length of the receiving member in the width direction decreases increasingly from upstream in the discharge direction toward the contact portion, and decreases increasingly from downstream in the discharge direction toward the contact portion. According to this aspect, the length of the receiving member in the width direction is the shortest at the contact portion, making it possible to suppress the snagging of the medium. Furthermore, in an area of the receiving member other than the contact portion and downstream in the discharge direction, a contact area between the receiving member and the medium increases, making it possible to stably support the receiving member.

In the accommodating device according to an eleventh aspect, in the ninth aspect or the tenth aspect, the adjustment unit includes a changing member configured to change a length of the notch portion in the width direction.

According to this aspect, the length of the notch portion in the width direction is changed in the changing member, and thus the length of the contact portion is adjusted in the width direction, making it possible to suppress the snagging of the medium without use of a separate member that deforms the receiving member.

In the accommodating device according to a twelfth aspect, in the eleventh aspect, a plurality of the changing members are provided to the receiving member in the discharge direction.

According to this aspect, even if a contact position of the tip portion of the medium with the receiving member is shifted in the discharge direction due to a change in the size of the medium or the like, the length of the contact portion in the width direction can be adjusted to match the medium by using the changing member closest to the shifted position to make an adjustment. Thus, even if properties such as rigidity with respect to a force acting on the medium in the thickness direction changes, it is possible to suppress the snagging of the medium.

In the accommodating device according to a thirteenth aspect, in the seventh aspect or the eighth aspect, the receiving member includes a first receiving member upstream and a second receiving member downstream divided in the discharge direction and including the contact portion, and the contact portion is provided with a coupling and separation member interposed between a downstream end portion of the first receiving member in the discharge direction and an upstream end portion of the second receiving member in the discharge direction, and configured to couple and separate at least a portion of the upstream end portion and at least a portion of the downstream end portion in the discharge direction.

According to this aspect, at east a portion of the upstream end portion and at least a portion of the downstream end portion can be coupled and separated in the discharge direction by the coupling and separation member, Then, an area where the first receiving member and the second receiving member are coupled by the coupling and separation member becomes the contact portion. In this way, the length of the portion coupled by the coupling and separation member in the width direction is changed, thereby changing the length of the contact portion in the width direction, and thus making it possible to easily adjust the length of the contact portion in the width direction.

In an accommodating device according to a fourteenth aspect, in the thirteenth aspect, the downstream end portion overlaps the upstream end portion in an intersecting direction intersecting both the discharge direction and the width direction, and is positioned between the upstream end portion and the medium, and the coupling and separation member is interposed between the downstream end portion and the upstream end portion in the intersecting direction.

According to this aspect, the second receiving member positioned downstream of the contact portion in the discharge direction is disposed at a location further separated from the medium than the first receiving member and the coupling and separation member in the intersecting direction, making it possible to suppress the snagging of the medium that accompanies contact between the medium and the second receiving member.

In an accommodating device according to a fifteenth aspect, in the seventh aspect and the eighth aspect, the adjustment unit is a winding unit configured to wind the receiving member in the discharge direction, thereby changing a position of the contact portion in the discharge direction.

According to this aspect, the winding unit winds the receiving member in the discharge direction, thereby changing a position of the contact portion in the discharge direction. Thus, even if the rigidity with respect to the force acting on the medium in the thickness direction changes or the causing the position where the tip portion of the medium comes into contact with the receiving member first to shift in the discharge direction, the snagging of the medium can be suppressed.

In accommodating device according to a sixteenth aspect, in the fifteenth aspect, the receiving member has a length in the width direction that increases from upstream to downstream in the discharge direction.

According to this aspect, the: length of the receiving member in the width direction differs in the discharge direction. Therefore, when the receiving member is wound by the winding unit, not only is the position in the discharge direction of the area that becomes the contact portion changed, but also the length in the width direction of the area that becomes the contact portion is simultaneously changed. Here, in a case in which another medium having a different length the width direction is used, the position of the contact portion the discharge direction and the length of the contact portion in the width direction are changed simultaneously in accordance with the other medium, making it possible to make the task of adjusting the contact portion easier compared to a configuration in which the position of the contact portion in the discharge direction and the length of the contact portion in the width direction are separately changed.

Furthermore, the contact area between the receiving member and the medium increases increasingly downstream e discharge direction, snaking it possible to stably support the medium downstream of the contact portion in the discharge direction.

An accommodating device according to a seventeenth aspect, in any one of the first aspect to the sixteenth aspect, further includes a support portion configured to movably support the receiving member in the width direction, thereby positioning at least one end portion of the contact portion in the width direction inward of at least one end portion of the medium reaching the contact portion.

According to this aspect, the position e width direction of the receiving member supported by the support portion can be changed. Here, in a case in which a central position of the receiving member in the width direction and a central position of the medium in the width direction are shifted, the central position of the contact portion in the width direction can he disposed in accordance with the central position of the medium in the width direction, making it possible to suppress biased contact of one side of the medium in the width direction with the contact portion.

A recording device according to an eighteenth aspect includes a recording unit provided to a device main body and configured to perform recording on a medium, and the accommodating device according to any o of the first aspect to the seventeenth aspect configured to medium discharged from the device main body.

According to this aspect, an effect similar to that in any of the first aspect to the seventeenth aspect can fie obtained.

Examples of an accommodating device and a recording device according to the present disclosure will be described below in detail.

Note that, in each of the drawings, an X direction along an X axis is a device width direction, and is a width direction of a sheet P, which is an example of a sheet-shaped medium. A −X direction is leftward and a +X direction is rightward when viewed from a user when a front face of the device is facing the user. A Y direction along a Y axis is a depth direction of the device. That is, a +Y direction is a direction from a back face toward the front face of the device. A −Y direction is a direction from the front face toward the back face of the device. The X direction and the Y direction are horizontal directions. A direction along a Z axis is a vertical direction, a +Z direction is vertically upward, and a −Z direction is vertically downward. The X direction, the Y direction, and the Z direction are mutually orthogonal.

A discharge direction in which the medium P is discharged froth a printer 10 described later is referred to as a +A direction. Note that the direction opposite to the discharge direction is referred to as a −A direction. When the directions are not differentiated, the direction is simply referred to as the A direction. The A direction intersects (is orthogonal to) the X direction. Furthermore, a direction orthogonal to the A direction when viewed from the X direction is referred to as a B direction. The B direction is an example of an intersecting direction in which the A direction intersects the X direction. Note that the A direction and the B direction vary depending on a posture of the sheet P being discharged. Therefore, in this exemplary embodiment, the A direction and the B direction are described as the A direction and the B direction when a tip portion PS of the sheet P reaches a contact portion 34 described la In a case in which the sheet P usable in the printer 10 needs to be differentiated in accordance with size, the sheet P having a size in which the length in the X direction is largest is referred to as a sheet PA, and the sheet P having a size in which the length in the X direction is smallest is referred to as a sheet PB.

First Exemplary Embodiment

FIG. 1 illustrates the printer 10, which is an example of a recording device.

The printer 10 includes a main body portion 11, a head unit 16 provided to the main body portion 11 and configured to perform recording on the sheet P, and a stacker unit 20 configured to receive the sheet P discharged from the main body portion 11. Specifically, the printer 10 is an ink jet-type printer configured to perform recording an image such as characters and photographs on the sheet P by ejecting ink, which is an example of a liquid, onto the sheet P.

The main body portion 11 is an example of a device main body. Further, the main body portion 11 includes a housing 12, leg portions 13 configured to support the housing 12, an accommodating portion (not illustrated) configured to accommodate the sheet P, an operating panel 14 operated and set to various setting; by the user, and a control unit 18 configured to control the operation of each component of the printer 10. The accommodating portion, the head unit 16, and the cm of unit 18 are accommodated in the housing 12.

A discharge port 17, which an example of a discharge unit, is formed in a front wall 12A of the housing 12 in the +Y direction. The discharge port 17 passes through the front wall 12A and extends in the X direction. The recorded sheet P is discharged from the discharge port 17 in the +A direction.

A discharge guide 19 is provided at an area of the front wall 12A in the −Z direction with respect to the discharge port 17. The discharge guide 19 is formed a fan shape protruding in the +Y direction when viewed from the X direction. In other words, the discharge guide 19 includes a curved surface 19A inclined downward in the −Z direction increasingly in the +Y direction. A length of the discharge guide 19 in the X direction is longer than a length of the sheet PA in the X direction.

The operating panel 14 is, as an example, configured as a touch panel type input unit. With the operating panel 14, instructions for setting the size of the sheet P and starting and ending a recording operation of the printer 10 are input by the user. The information input with the operating panel 14 is transmitted to the control unit 18. Further, size information of the sheet P set by the user is displayed on the operating panel 14.

The head unit 16 is an example of a recording unit. Further, the head unit 16 is attached to a carriage (not illustrated), and is capable of reciprocating in the X direction. The head unit 16 records by discharging ink onto the sheet Based on the information received from the operating panel 14, the control unit 18 controls the operation and the stopping of each component of the printer 10. Further, in a case in which the combination of the size of the sheet P to be used and the position of a slide frame 26 (FIG. 2) described later in the X direction differs from a preset combination, the control unit 18 displays error information on the operating panel 14. That is, the user is notified whether or not the position of the slide frame 26 is appropriate.

Figure 2:
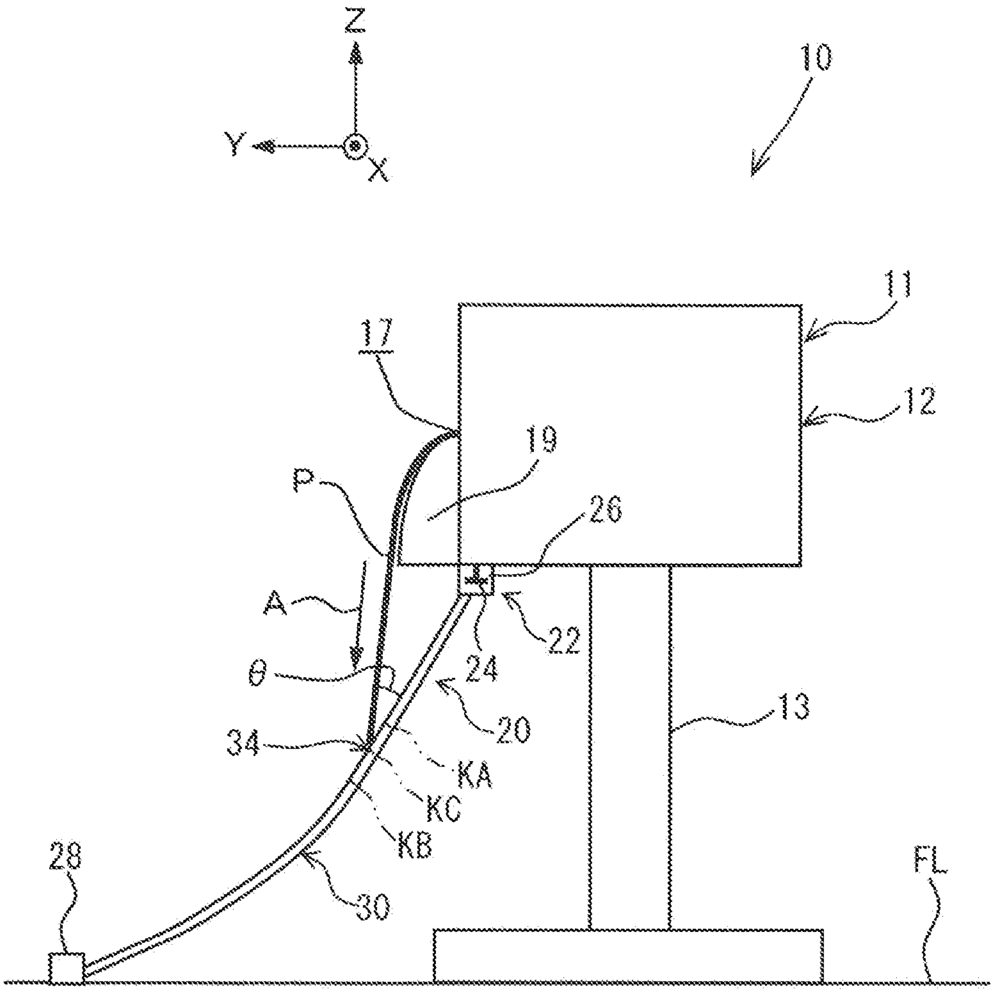
FIG. 2 is a side view of the printer of the first exemplary embodiment.

As illustrated in FIG. 2, the stacker unit 20 is an example of an accommodating device, and includes a sheet member 30, which is an example of a receiving member, and a support frame 22, which is an example of a support portion configured to movably support the sheet member 30 in the X direction. Then, the stacker unit 20 is configured to receive in the sheet member 30 the sheet P discharged from the discharge port 17 in the A direction.

The support frame 22 movably supports the sheet member 30 in the X direction and thus at least one end portion of the contact portion 34 described later in the X direction is positioned inward of at east one end portion of the sheet P reaching the contact portion 34.

Specifically, the support frame 22 includes, as an example, a slide rail 24, the slide frame 26, and a weight frame 28. The slide rail 24 is attached to the end portion of the housing 12 in the −Z direction and extends in the X direction. Further, a shape of the Y-Z cross section of the slide rail 24 is an inverted T.

The slide frame 26 extends in the X direction and holds an end portion of the sheet member 30, described later, upstream in the A direction. Further, the slide frame 26 is supported by the slide rail 24 and is capable of sliding in the X direction with respect to the slide rail 24. In other words, the slide frame 26 can change in position in the X direction with respect to the housing 12. Note that the slide frame 26 is, as an example, slid in the X direction by the user. The housing 12 is provided with a sensor (not illustrated) configured to detect the position of the slide frame 26 in the X direction. The detection information from the sensor is transmitted to the control unit 18 (FIG. 1).

The weight frame 28 extends in the X direction and holds an end portion of the sheet member 30 downstream in the A direction. A weight of the weight frame 28 is greater than a weight of the slide frame 26, and the weight frame 28 is placed on a floor FL at an installation location of the printer 10, thereby suppressing a shift in the position of the weight frame 28. Note that, when the position of the sheet member 30 is shifted in the X direction, the weight frame 28 is moved in the X direction by the user. The weight frame 28 may be provisional secured to the floor FL using a screw (not illustrated).

Figure 3:
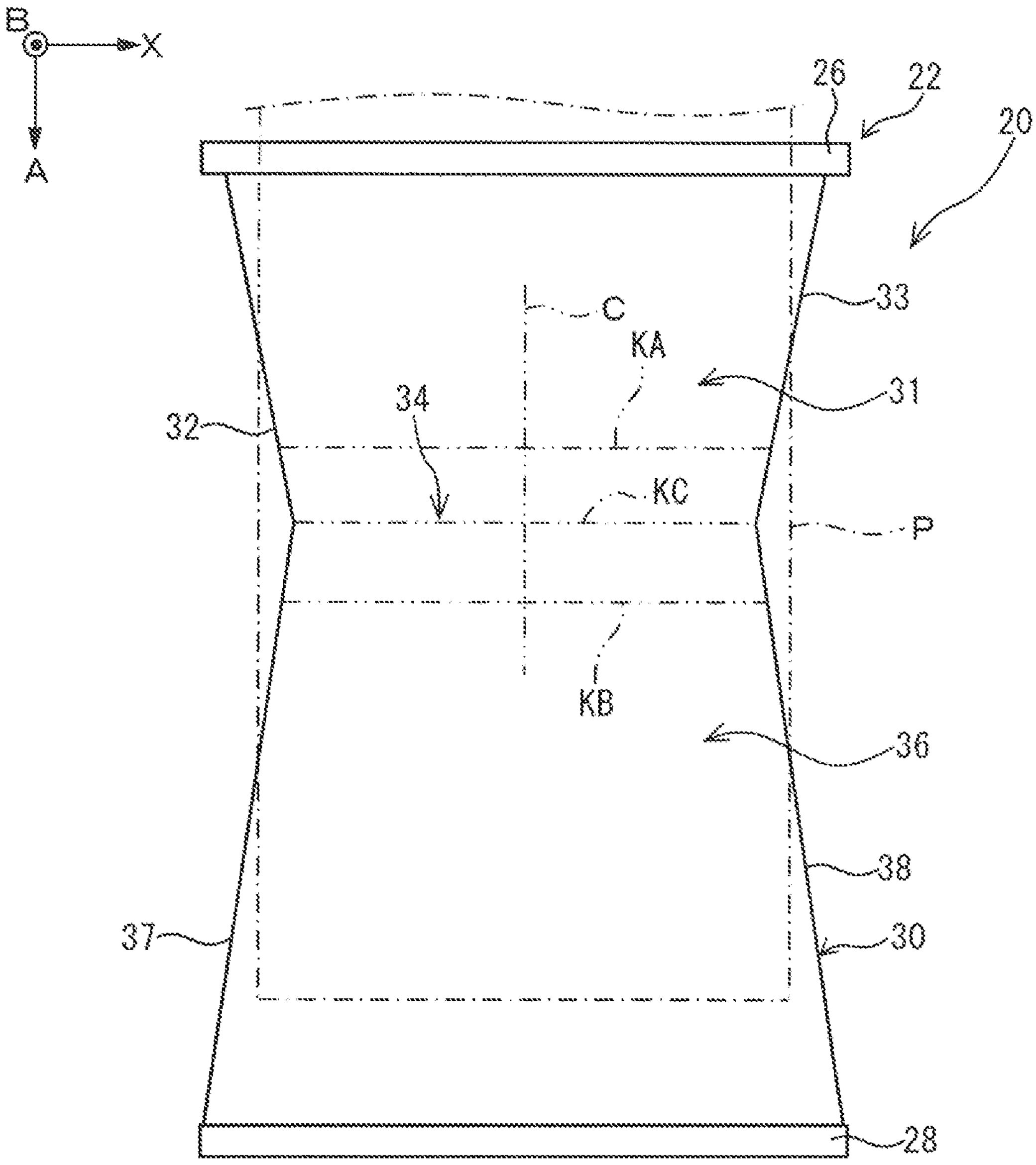
FIG. 3 is a schematic view illustrating an arrangement relationship between a sheet and both a sheet member and a slide portion of the first exemplary embodiment.

As illustrated in FIG. 3, the sheet member 30 is a member having a predetermined thickness in the B direction and extends in the x-y plane. Further, the sheet member 30 is, for example, a long cloth constituted by a woven cloth, a non-woven cloth, or the lie, having a length in the A direction longer than a length in the X direction. The sheet member 30 has flexibility. "Flexibility" refers to a property in which the sheet member 30 changes to a curved state under its own weight.

Specifically, the sheet member 30 is, as an example, formed into an overall hourglass shape when viewed from the B direction. Further, the sheet member 30 includes the contact portion 34, an upstream portion 31, which is an area upstream of the contact portion 34, and a downstream portion 36, which is an area downstream of the contact portion 34.

The upstream portion 31 is formed as an area having an isosceles trapezoidal shape in reverse orientation with respect to the +A direction when viewed from the B direction. In other words, a length of the upstream portion 31 in the X direction gradually decreases from upstream to downstream in the +A direction. An end portion 32 of the upstream portion 31 in the −X direction extends in a direction intersecting the +A direction, and a downstream side in the +A direction is positioned inward of an upstream side in the X direction. "Inward" refers to being closer to an imaginary center line C passing through a center of the sheet member 3 in the X direction and extending in the A direction. An end portion 33 of the upstream portion 31 in the +X direction extends in a direction intersecting the +A direction, and a downstream side in the +A direction is positioned inward of an upstream side in the X direction.

A length in the X direction of an upstream end of the upstream portion 31 n the +A direction is, as an example, longer than the length of the sheet PA in the X direction. Further, a length in the X direction of a downstream end of the upstream portion 31 in the +A direction is shorter than a length of the sheet PB in the X direction.

The contact portion 34 is formed as an area where a tip portion of the sheet P discharged from the discharge port 17 (FIG. 1) comes into contact with the sheet member 30 first. In the first exemplary embodiment, the configuration of the sheet member 30 will be described assuming that the position where the tip portion of the sheet comes into contact with the sheet member 30 is substantially the same in the +A direction even when the size of the sheet P is changed. Sheet members 30 having different lengths in the X direction and positions in the A direction of the contact portion 34 may be prepared, and the sheet member 30 may he replaced in accordance with the size of the sheet P. Further, the contact portion 34 is an area where the length of the sheet member 30 in the X direction is shortest.

Note that, in an ideal state, the contact portion 34 is set as a linear portion long in the X direction at a specific position in the A direction, but in fact, because the position where the tip portion of the sheet P reaches the sheet member 30 varies due to error factors such s differences in an amount of ink deposited onto the sheet P, is set as an area having a length within a permissible range in the A direction. In FIG. 3, an imaginary KA representing an upstream end of the contact portion 34 in the +A direction and imaginary line KB representing a downstream end of the contact portion 34 in the +A direction are illustrated. In other words, of the sheet member 30, the portion between the imaginary line KA and the imaginary line KB corresponds to the contact portion 34. In the contact portion 34, an ideal target position at which the tip portion of the sheet P comes into contact therewith is indicated by an imaginary line KC.

In the X direction, at least one end portion of the contact portion 34 is set and thus positioned inward of at east one end portion of the sheet P reaching the contact portion 34. Specifically, both end portions of the contact portion 34 in the X direction are positioned inward of both end portions of the sheet P in the X direction.

As illustrated in FIG. 2, the contact portion 34 is obliquely disposed, positioning the downstream portion in the +A direction below the upstream portion in the Z direction, and positioning the downstream portion in the +A direction in the +Y direction relative to the upstream portion when viewed from the X direction.

In this exemplary embodiment, in a state in which the tip portion of the sheet P is in contact with the contact portion 34, an angle θ formed by the sheet P and a tangent line (not illustrated) of the curved sheet member 30 is, as an example, smaller than 45°.

As illustrated in FIG. 3, the downstream portion 36 is formed as an area having an isosceles trapezoidal shape with respect to the +A direction when viewed from the B direction. In other words, a length of the downstream portion 36 in the X direction gradually increases from upstream to downstream in the +A direction. An oblique side portion 37 is formed at an end portion the downstream portion 36 in the −X direction. An oblique side portion 38 is formed at an end portion of the downstream portion 36 in the +X direction. The oblique side portions 37, 38 are areas that extend in a direction intersecting the +A direction, with a downstream side in the +A direction outward of an upstream side in the X direction. "Outward" refers to being away from the imaginary center line C passing through the center of the sheet member 30 in the X direction and extending in the A direction. Further, the oblique side portion 37 and the oblique side portion 38 are in a line-symmetrical relationship with respect to the center line C.

A length in the X direction of an upstream end of the downstream portion 36 in the +A direction is, as an example, shorter than the length of the sheet PB in the X direction. Further, a length in the X direction of a downstream end of the downstream portion 36 in the +A direction is longer than the length of the sheet PA in the X direction. In other words, the end portion of the sheet member 30 in the X direction and down stream of the contact portion 34 in the +A direction is positioned outward of the end portion of the sheet P in the X direction. As a result, both end portions of the downstream portion 36 in the X direction o not come into contact with both end portions of the sheet P in the X direction at a position close to the contact portion 34, and come into contact with both end portions of the sheet P in the X direction at a position away from the contact portion 34.

Although not illustrated, as a comparison example with respect to this exemplary embodiment, when a long cloth member longer in the X direction than the sheet P and long in the A direction is suspended, a central portion of the cloth member n the X direction hangs further downward than both end portions under its own weight. Therefore, when the sheet P comes into contact with the cloth member at a predetermined angle, it is highly likely both end portions of the sheet P in the X direction will be the portions that come into contact with the cloth member first.

However, both end portions of the sheet P in the X direction, compared to the central portion, readily deform when an external force acts thereon. Therefore, when both end portions of the sheet P come into contact with the cloth member first, the sheet P readily deforms and is snagged on the cloth member.

Next, the action e printer 10 and the stacker unit 20 according to the first exemplary embodiment will be described with reference to FIG. 1 to FIG. 6. Note that individual descriptions of the figure numbers are omitted in the descriptions of FIG. 1 to FIG. 3.

In the printer 10, in a case in which the size of the sheet P to be used and the position of the slide frame 26 in the X direction are the correct combination, recording is performed on the, sheet P by the head unit 16. Then, the sheet P recorded by the head unit 16 is discharged from the discharge port 17 in the +A direction. Note that sheet PB is used here as the sheet P.

Figure 4:
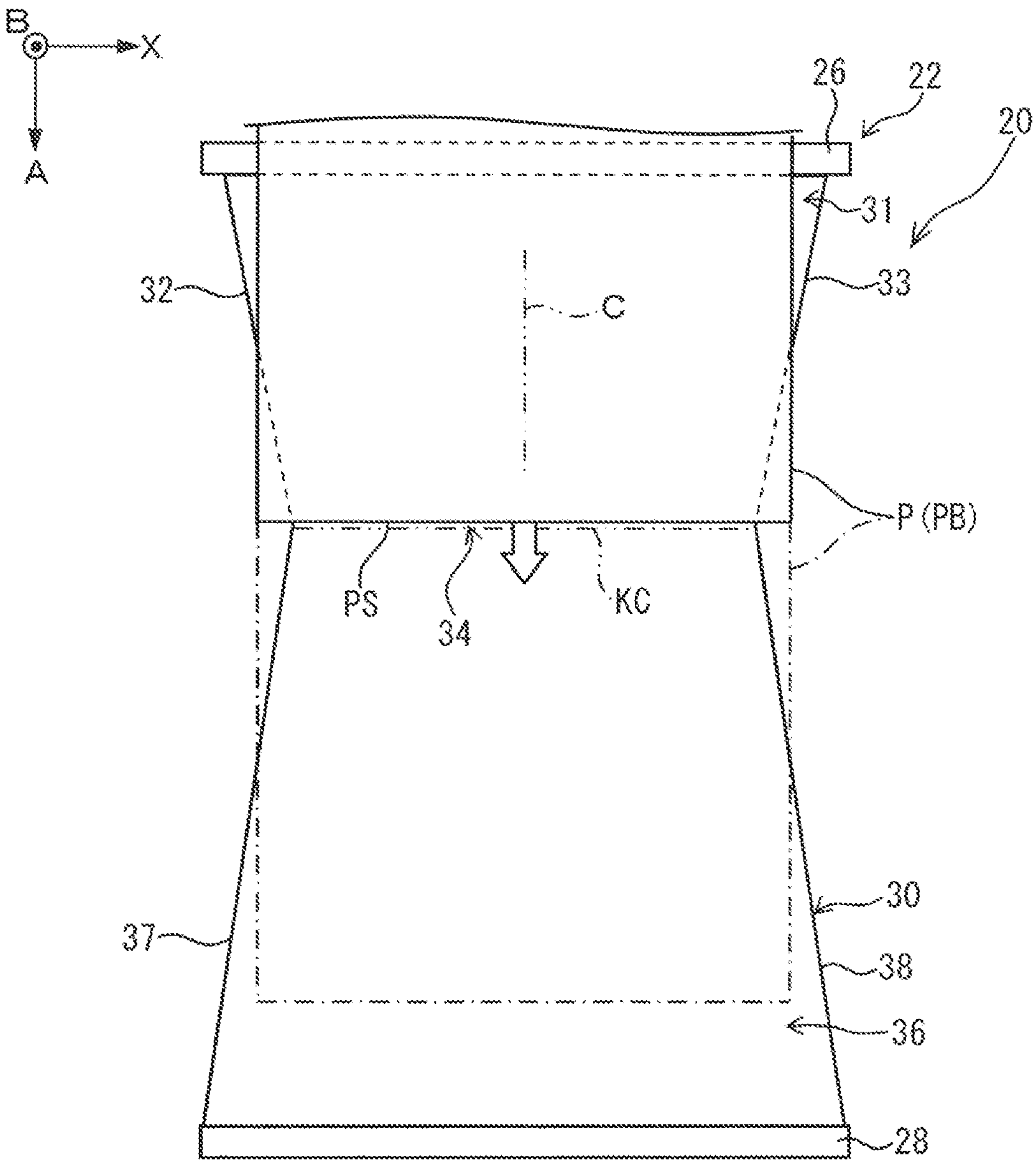
FIG. 4 is a schematic view illustrating a state in which a tip portion of the sheet is in contact with the contact portion of the sheet member of the first exemplary embodiment.

As illustrated in FIG. 4, the tip portion of the sheet P comes into contact with the contact portion 34 while lowering under its own weight.

Figure 5:
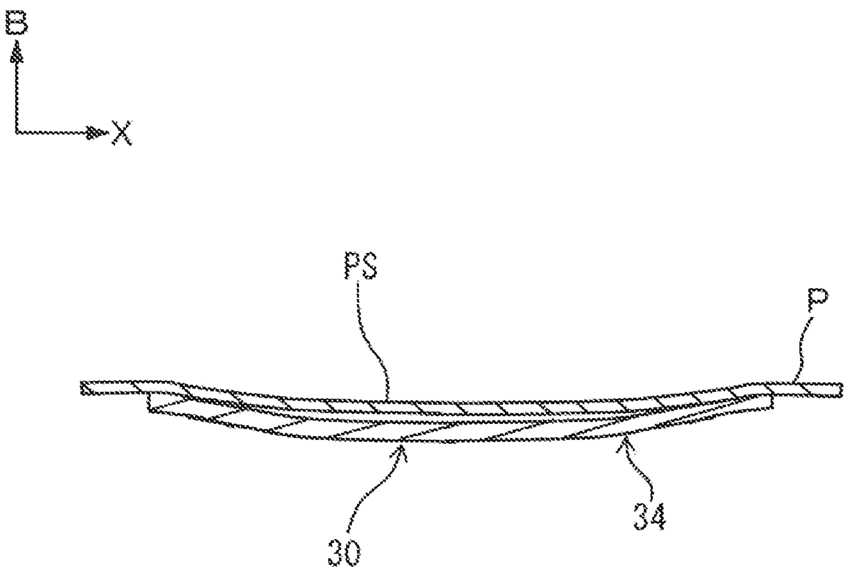
FIG. 5 is a longitudinal cross-sectional view of the sheet and the contact portion of the sheet member of the first exemplary embodiment.

As illustrated in FIG. 5, the length of the contact portion 34 in the X direction is shorter than the length of the street P in the X direction. Therefore, when the tip portion PS of the sheet P reaches the contact portion 34, both end portions of the sheet P in the X direction do not come into contact with the contact portion 34, that is, the sheet member 30. This makes deformation of both end portions of the sheet P less likely, making it possible to suppress the snagging of sheet P on the sheet member 30 when a portion of the sheet P comes into contact with the contact portion 34.

On the other hand, when the tip portion of the sheet P reaches the contact portion 34, at least a portion of the sheet P inward of both end portions in the X direction comes into contact with the contact portion 34. Then, the portion of the sheet P in contact with the contact portion 34 is moved along the sheet member 30, Thus, in the downstream portion 36, even if the entire surface of the sheet. P and the downstream portion 36 come into contact with each other, it is possible to suppress the snagging of the sheet P on the sheet member 30.

Figure 6:
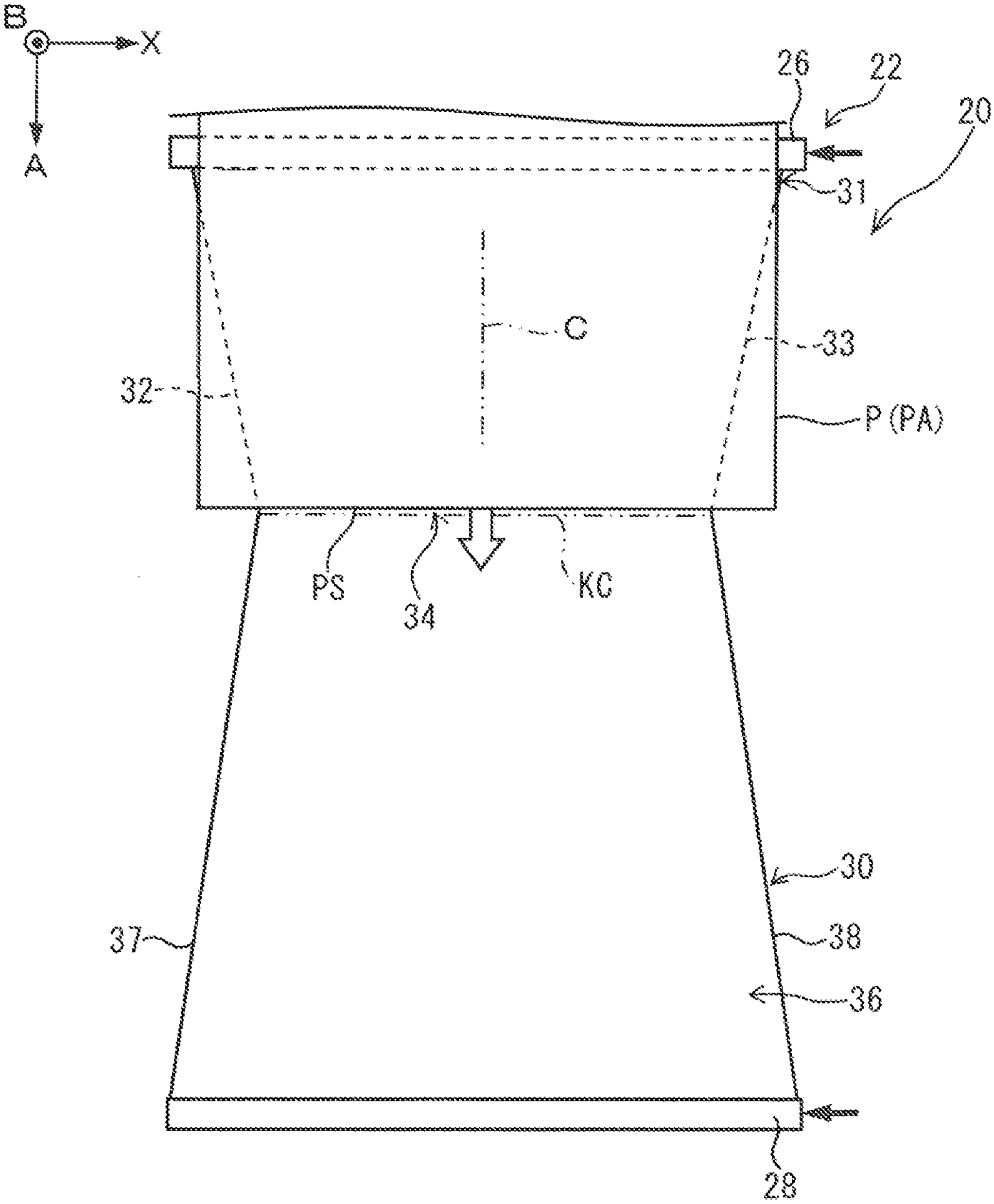
FIG. 6 is a schematic view illustrating a state in which the slide portion is moved together with the sheet in the first exemplary embodiment.

As illustrated in FIG. 6, when the sheet PA is to he used in place of the sheet PB in the printer 10 (FIG. 1), the user is notified of instruction information by the operating panel 14 for changing the position of the slide frame 26 in the X direction (FIG. 1) in advance. Then, the slide frame 26 is moved in the −X direction, and thus the central position thereof in the X direction is aligned with the central position of the sheet PA in the X direction. Further, in accordance with the movement of the slide frame 26, the weight frame 28 is also moved in the −X direction.

In this state, at least a portion of the tip portion PS of the sheet PA discharged from the discharge port 17 excluding both end portions in the X direction comes into contact with the contact portion 34. Here, because both end portions of the sheet PA in the X direction do not come into contact with the sheet member 30, when the sheet PA comes into contact the sheet member 30 it is possible to suppress the snagging of sheet P on the sheet member 30.

As described above, according to the stacker unit 20, only the state of the sheet member 30 need be managed, and thus the handling of the stacker unit 20 is easy compared to a configuration in which the states of other members different om the sheet member 30 are also managed. Furthermore, at east one end portion of the contact portion 34 is positioned inward in the X direction of at least one end portion of the sheet P reaching the contact portion 34. Thus, when the sheet P discharged from the discharge port 17 reaches the receiving member 30, at least one end portion of the sheet P is in a non-contact state with the sheet member 30, making it possible to suppress the snagging of the sheet P on the receiving member 30.

According to the stacker unit 20, when the sheet P discharged from the discharge port 17 reaches the sheet member 30, the tip portion of the sheet P comes into contact with the contact portion 34 first. Thus, the end portion of the tip portion of the sheet P in the X direction susceptible to snagging is in a non-contact state with the sheet member 30, making it possible to suppress the snagging of the sheet P on the sheet member 30. Further, when the sheet P reaches the sheet member 30, both end portions of the sheet P in the X direction are in a non-contact state with the sheet member 30, making it possible to further suppress the snagging of the sheet P on the sheet member 30 compared to a configuration in which only one end portion of the sheet P is in a non-contact state.

According to the stacker unit 20, the tip portion of the sheet P, which is in a state of hanging downward under its own weight, comes into contact with the contact portion 34 obliquely disposed, and thus a reaction force from contact portion 34 that acts on the tip portion of the sheet P is suppressed, making it possible to suppress deformation of the tip portion of the sheet P compared to a configuration in which the contact portion 34 is horizontally disposed.

Further, the length in the X direction of the downstream portion 36 of the sheet member 30 downstream of the contact portion 34 is longer than the length of the sheet P in the X direction. Thus, the sheet P moved downstream from the contact portion 34 in the A direction is supported by the sheet member 30, making it possible to stabilize the posture of the sheet P received by the receiving member 30.

According to the stacker unit 20, there is no step portion at the end portion of the sheet member 30 in the X direction, making it possible to move the sheet P in the A direction after the sheet P is brought into contact with the contact portion 34.

Further, the sheet member 30 supported by the support frame 22 can be changed in position in the X direction. Here, in a case in which a central position of the sheet member 30 in the X direction and a central position of the sheet P in the X direction are shifted, the central position of the contact portion 34 in the X direction can be disposed in accordance with the central position of the sheet P in the X direction, making it possible to suppress biased contact of one side of the sheet P in the X direction with the contact portion 34.

According to the printer 10, an effect similar to that of the stacker unit 20 can be obtained.

Second Exemplary Embodiment

Next, a stacker unit 40 of a second exemplary embodiment, which is an example of the accommodating device, will be described in detail with reference to the accompanying drawings. Note that portions common to the portions of the printer 10 according to the first exemplary embodiment are denoted by the same reference signs and descriptions thereof will be omitted. Further, descriptions of actions and effects similar to those of the printer 10 of the first exemplary embodiment will also be omitted.

Figure 7:
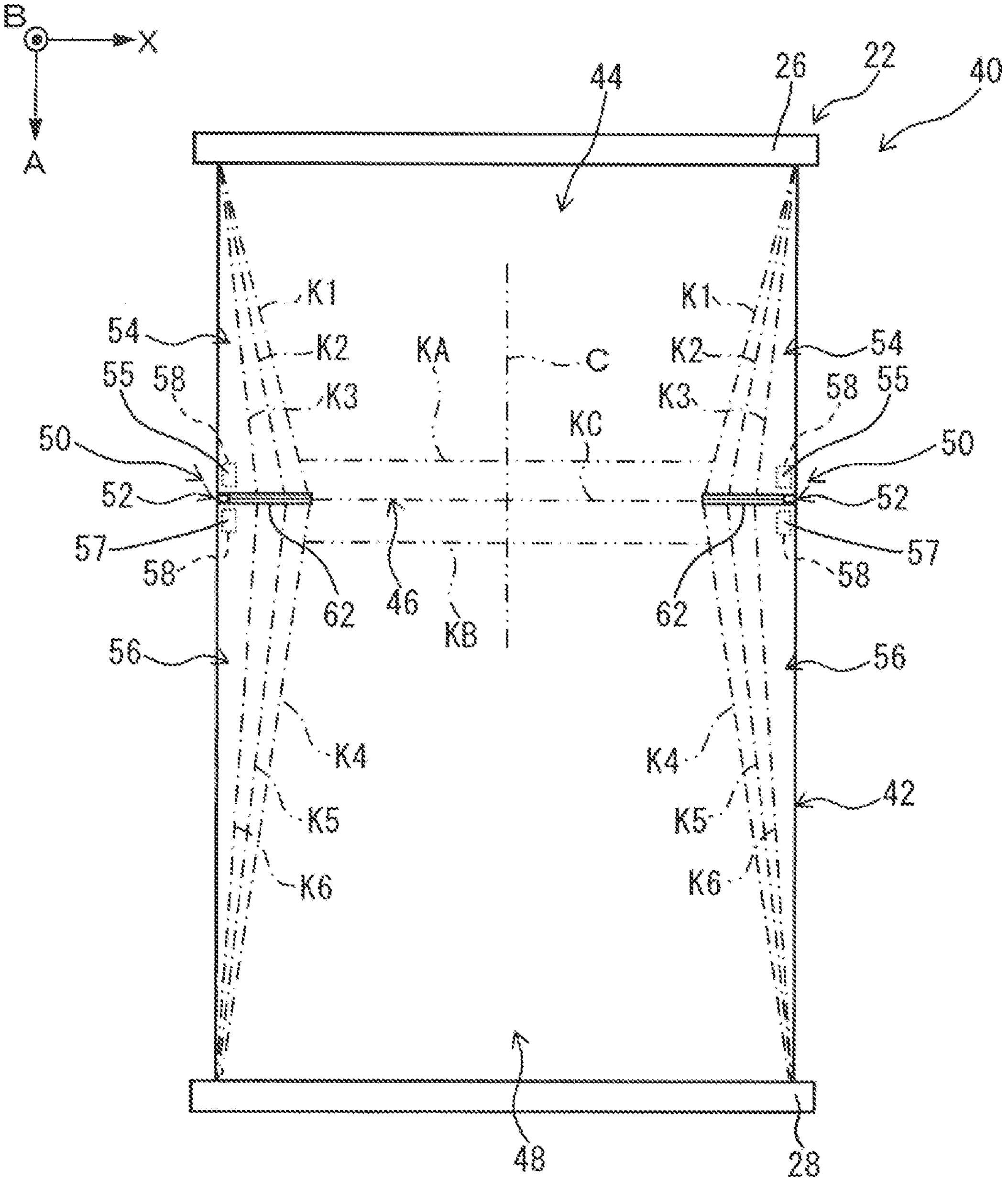
FIG. 7 is a schematic view illustrating a sheet member and a slide portion according to a second exemplary embodiment.

The stacker unit 40 is illustrated in FIG. 7. The stacker unit 40 is provided in the printer 10 (FIG. 1) in place of the stacker unit 20 (FIG. 1). Further, the stacker unit 40 includes a sheet member 42, which is an example of the receiving member, and the support frame 22 configured to movably support the sheet member 42 in the X direction. Then, the stacker unit 40 is configured to receive in the sheet member 42 the sheet P discharged from the discharge port 17 (FIG. 1) in the +A direction.

The sheet member 42 has a predetermined thickness in the B direction. Further, the sheet member 42 is, for example, a long cloth constituted by a woven cloth, a non-woven cloth, or the like, having a length in the A direction longer than a length in the X direction. Furthermore, the sheet member 42 has flexibility.

Specifically, the sheet member 30 is, as an example, formed into an overall rectangular shape when viewed froth the B direction. Further, the sheet member 30 includes a contact portion 46, an upstream portion 44, which is an area upstream of the contact portion 46, and a downstream portion 48, which is an area downstream of the contact portion 46. The sheet. member 42 is provided with two adjustment units 50 capable of adjusting length of the contact portion 46 in the X direction. The two adjustment units 50 are configured to adjust the length of the contact portion 46 in the X direction, thereby positioning both end portions of the contact portion 46 in the X direction inward of both end portions of the sheet P in the X direction. A specific configuration of the adjustment units 50 will be described later.

The length of the contact portion 46 in the X direction is adjusted by the adjustment units 50, thereby forming the upstream portion 44 into an isosceles trapezoidal shape having a reverse orientation when viewed from the B direction. The upstream portion 44 formed into an isosceles trapezoidal shape having a reverse orientation has the same configuration as that of the upstream portion 31 (FIG. 3), and therefore descriptions thereof will be omitted.

The length of the contact portion 46 is adjusted in the X direction by the adjustment units 50, thereby forming the downstream portion 44 into an isosceles trapezoidal shape when viewed from the B direction. The downstream portion 48 formed into an isosceles trapezoidal shape has the same configuration as that of the downstream portion 36 (FIG. 3), and therefore descriptions thereof will be omitted.

The contact portion 46 is formed as an area of the sheet member 42, with which the tip portion PS (FIG. 1) of the sheet P comes into contact first. In the second exemplary embodiment, the configuration of the sheet member 42 will be described assuming hat the position where the tip portion of the sheet P comes into contact with the sheet member 42 is substantially the same in the +A direction every when the size of the sheet P is changed. Further, in a state after the length in the X direction is adjusted by the adjustment units 50 described later, the contact portion 46 is an area where the length of the sheet member 42 in the X direction is shortest.

Note that, in an ideal state, the contact portion 46 is set as a linear portion long in the X direction at a specific position in the A direction, but in fact, because the position where the tip portion of the sheet P reaches the sheet member 42 varies due to error factors such as differences in an amount of ink deposited onto the sheet P, is set as an area having a length within a permissible range in the A direction. The area between imaginary line KA and the imaginary line KB in FIG. 7 corresponds to the contact portion 46.

Both end portions of the contact portion 46 in the X direction are positioned inward of both end portions of the sheet PB in the X direction. Further, the contact portion 46 is obliquely disposed, positioning the downstream portion in the +A direction downward of the upstream portion in the Z direction, and positioning the downstream portion in the +A direction in the +Y direction relative to the upstream portion when viewed from the X direction.

The two adjustment units 50 are, as an example, disposed linearly symmetrically with respect to the center line C passing through a center of the sheet member 42 in the X direction and extending in the A direction. That is, the two adjustment units 50 have a similar configuration except for the arrangement and orientation of the members. Therefore, the adjustment unit 50 in the +X direction will be described, and the description of the adjustment unit 50 in the −X direction will be omitted.

The adjustment unit 50 includes a notch portion 52, a first adjustment unit 54, a second adjustment unit 56, a holding unit 58, and a fastener 62.

The notch portion 52 is a portion of the sheet member 42 cut from art end portion in the +X direction toward a central portion. Further, the notch portion 52 is positioned in the +X direction with respect to the contact portion 46. In other words, the notch portion 52 is a portion of the sheet member 42 cut from the end portion in the +X direction to the contact portion 46.

The first adjustment unit 54 is positioned upstream of the notch portion 52 in the +A direction and positioned in the +X direction with respect to the upstream portion 44 in the sheet member 42. Furthermore, the first adjustment unit 54 is integrated with the upstream portion 44. That is, an end portion of the first adjustment unit 54 in the −X direction s an end portion of the upstream portion 44 in the +X direction. Further, the first adjustment unit 54 is formed as an area having a shape of a right triangle when viewed from the B direction. In other words, a length of the first adjustment unit 54 in the X direction gradually increases from upstream to downstream in the +A direction. An end portion in the +A direction of an end portion of the first adjustment unit 54 in the +X direction is referred to as a corner 55.

The first adjustment unit 54, similar to the upstream portion 44, has flexibility. Thus, the first adjustment unit 54 is capable of curving or bending in the −B direction, which is a rearward direction with respect to the upstream portion 44. By the first adjustment unit 54 being curved or bent to the rear side of the upstream portion 44, it is possible to adjust the lengths of the upstream portion 44 and the contact portion 46 in the X direction.

In FIG. 7, imaginary lines K1, K2, K3 indicated by dot-dash lines are illustrated as examples of positions in which the first adjustment unit 54 is folded back to the rear side of the upstream portion 44. The length of the contact portion 46 in the X direction gradually increases in the order of the imaginary lines K1, K2, K3.

The second adjustment unit 56 is positioned downstream of the notch portion 52 in the +A direction and positioned in the +X direction with respect to the downstream portion 48 in the sheet member 42. Furthermore, the second adjustment unit 56 is integrated with the downstream portion 48. That is, an end portion of the second adjustment unit 56 in the −X direction is an end portion of the downstream portion 48 in the +X direction. Further, the second adjustment unit 56 is formed as an area having a shape of a right triangle in reverse orientation when viewed from the B direction. In other words, a length of the second adjustment unit 56 in the X direction gradually decreases from upstream to downstream in the A direction. An upstream end portion in the A direction of an end portion of the second adjustment unit 56 in the +X direction is referred to as a corner 57.

The second adjustment unit 56, similar to the downstream portion 44, has flexibility. Thus, the second adjustment unit 56 is capable of curving or bending in the −B direction, which is the rearward direction with respect to the downstream portion 48. By the second adjustment unit 54 being curved or bent to the rear side of the downstream portion 48, it is possible to adjust the lengths of the downstream portion 48 and the contact portion 46 in the X direction.

In FIG. 7, imaginary lines K4, K5, K6 are illustrated as examples of positions in which the second adjustment unit 56 is folded back to the rear side of the downstream portion 48. The length of the contact portion 46 in the X direction gradually increases in the order of the imaginary lines K4, K5, K6.

Figure 8:
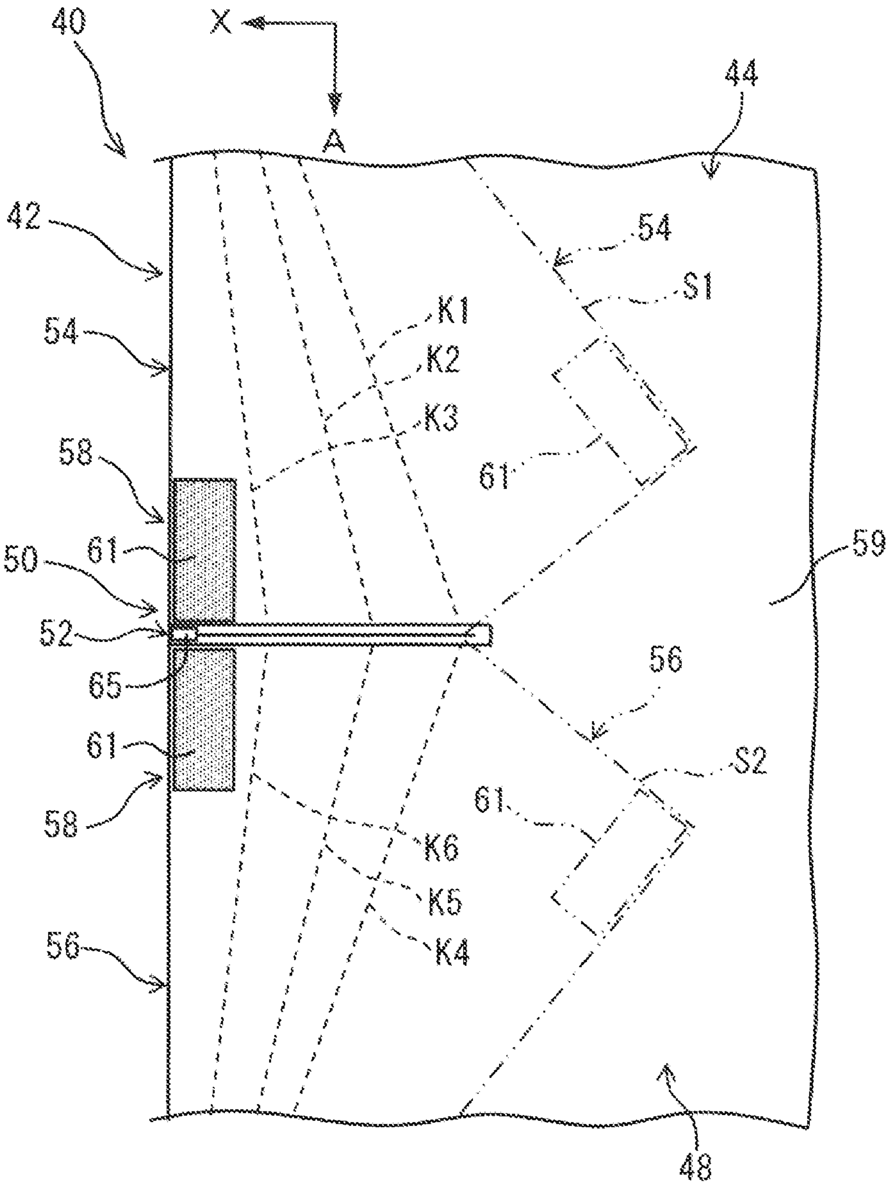
FIG. 8 is an enlarged schematic view of a separation portion of the sheet member and a periphery portion of the separation portion of the second exemplary embodiment.

FIG. 8 illustrates a state in which a peripheral portion of the notch portion 52 of the sheet member 42 is viewed from the rear side in the B direction.

The holding unit 58 holds the first adjustment unit 54 and the second adjustment unit 56 in a retracted state, separated from the sheet P. Specifically, the holding unit 58 is, as an example, configured as Magictape (trade name) composed of a female member 59 and a male member 61.

The female member 59 is a member in which a plurality of fibers (not illustrated) having an annular shape are aligned. Further, the female member 59 is attached across each surface in the −B direction of the upstream portion 44, the downstream portion 48, the first adjustment unit 54, and the second adjustment unit 56.

The male member 61 is a member in which a plurality of hooks (not illustrated) are aligned. Further, the male member 61 is, as an example, attached to each surface in the −B direction of the first adjustment unit 54 and the second adjustment unit 56 and to the corners 55, 57.

Here, as illustrated by the imaginary lines S1, S2, the first adjustment unit 54 and the second adjustment unit 56 that make a valley fold at e imaginary lines K1, K4 are held by the holding unit 58 with the male member 59 engaged with the female member 59. In other words, the first adjustment unit 54 and the second adjustment unit 56 are in a held state held by the holding unit 58, thereby restricting movement to the original position. The first adjustment unit 54 and the second adjustment unit 56 are movable to the original position by releasing the engagement between the male member 61 and the female member 59 of the holding unit 58.

The fastener 62 is an example of a changing member capable of changing the length of the notch portion 52 in the X direction. Further, the fastener 62 is constituted elements 63, 64, and a slider 65.

The element 63 is provided to a downstream end portion of the first adjustment unit 54 in the +A direction, and extends in the X direction. The element 64 is provided to an upstream end portion of the second adjustment unit 56 in the +A direction, and extends in the X direction. A portion where the element 63 and the element 64 are engaged is included in the contact portion 46. A portion where the element 63 and the element 64 are disengaged included in the notch portion 52.

The slider 65 is provided with a pull (not illustrated). Further, the element 63 and the element 64 are engaged in he A direction by moving the slider in the +X direction Further, the element 63 and the element 64 are disengaged in t A direction by moving the slider 65 in the −X direction. In this way, the slider 65 decreases the length of the contact portion 46 in the X direction and the length of the notch portion 52 in the X direction be being loved in. the +X direction. Further, the slider 65 increases the length of the contact portion 46 in the X direction and the length of the notch portion 52 in the X direction by being moved in the −X direction.

As illustrated in FIG. 7, in the retracted state described above, the length of the sheet member 42 in the X direction decreases increasingly from upstream in the +A direction toward the contact portion 46, and decreases increasingly from downstream in the +A direction toward the contact portion 46.

Next, the action of the stacker unit 40 will be described.

Figure 9:
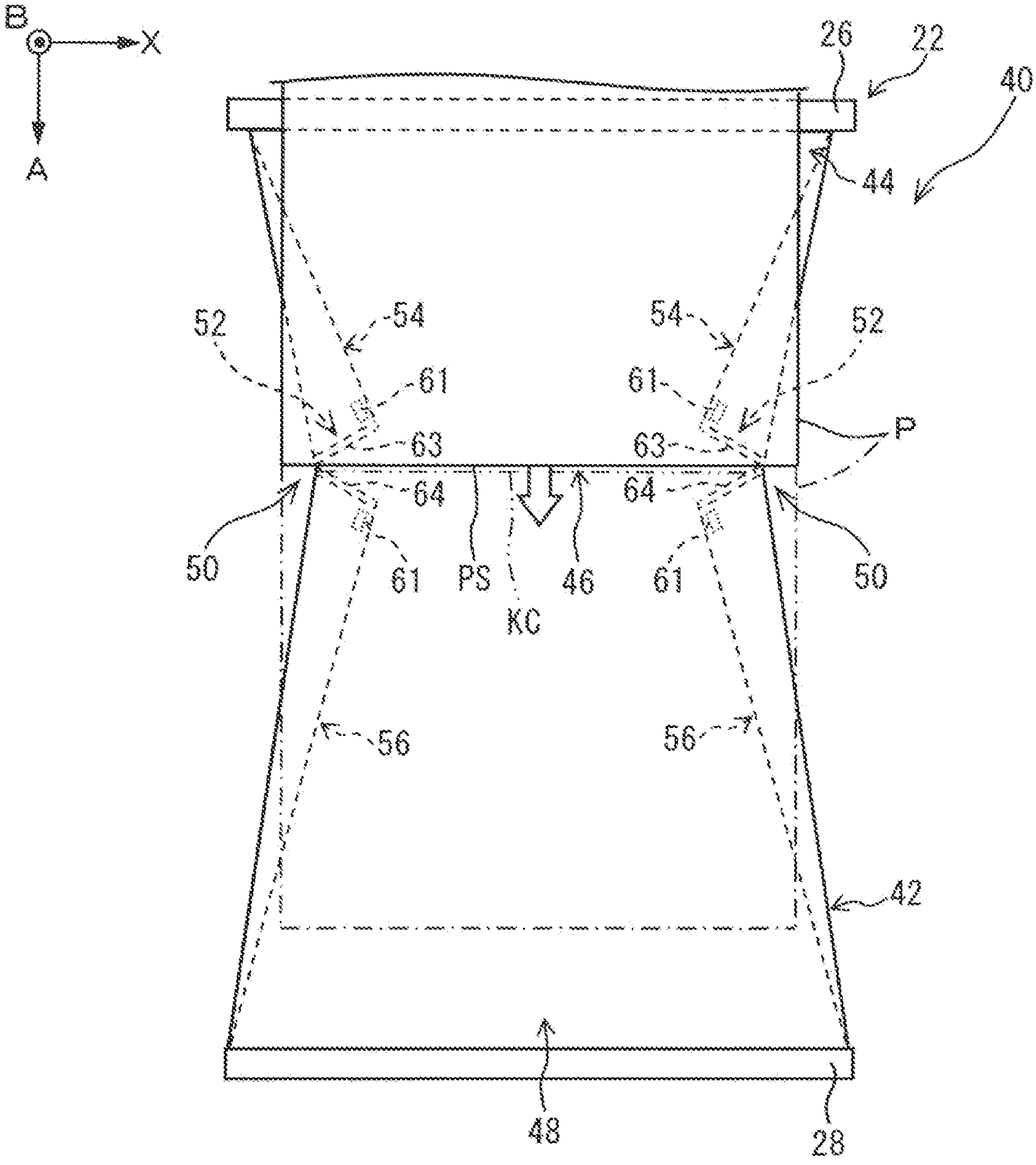
FIG. 9 is a schematic view illustrating a state in which a tip portion of the sheet is in contact with the contact portion of the sheet member of the second exemplary embodiment.

As illustrated in FIG. 9, the length of the notch portion 52 in the X direction is adjusted in advance by the slider 65 (FIG. 8) being operated in accordance with the sheet P to be used. Then, the first adjustment unit 54 and the second adjustment unit 56 are bent in the −B direction and the male member 61 is engaged with the female member 59 (FIG. 8), thereby placing the first adjustment unit 54 and the second adjustment unit 56 in a held state.

Here, the length of the contact portion 34 in the X direction is shorter than the length of the sheet P in the X direction. Therefore, when the tip portion PS of the sheet P reaches the contact portion 46, both end portions of the sheet Pin the X direction do not come into contact with the contact portion 46, that is, the sheet member 42. This makes deformation of both end portions of the sheet P less likely, making it possible to suppress the snagging of the sheet P on the sheet member 42 when a portion of the sheet P comes into contact with the contact portion 42.

On the other hand, when the tip portion of the sheet P reaches the contact portion 46, at least a portion of the sheet P inward of both end portions in the X direction comes into contact with the contact portion 46. Then, the portion of the sheet. Pin contact with the contact portion 46 is moved along the sheet member 42. Thus, in the downstream portion 48, even if the entire surface of the sheet P and the downstream portion 48 come into contact with each other, it is possible to suppress the snagging of the sheet P on the sheet member 42.

Thus, as described above, according to the stacker unit 40, even in a case in which the sheet 1 having different lengths in the X direction is used, the length of the contact portion 46 in the X direction is adjusted to match the length of the used sheet P in the X direction by the adjustment unit 50, thereby suppressing contact between the end portion of the sheet P and the receiving member 42 and thus making it possible to suppress the snagging of the sheet P.

Further, in a case in which the sheet P having different lengths in the X direction is used, when the sheet P reaches the sheet member 42, both end portions of the sheet P in the X direction are in a non-contact state with the sheet member 42, making it possible to further suppress the snagging of the sheet P on the sheet member 42.

According to the stacker unit 40, when the length of the contact portion 46 in the X direction is not adjusted, the first adjustment unit 54 and the second adjustment unit 56 are aligned in the A direction and function as a portion of the contact portion 46.

On the other hand, when the length of the contact portion 46 in the X direction is adjusted, the holding unit 58 holds the first adjustment unit 54 and the second adjustment unit 56, bringing the first adjustment unit 54 and the second adjustment unit 56 into a retracted state away from the sheet P, and shortening the length of the contact portion 46 in the X direction. In this way, the length of the contact portion 46 in the X direction can be adjusted by the presence or absence of the holding of the first adjustment unit 54 and the second adjustment unit 56 by the holding unit 58, and thus adjustment can be made using a smaller number of components.

According to the stacker unit, the length of the sheet member 42 in the X direction is shortest at the contact portion 46, making it possible to suppress the snagging of the sheet P. Furthermore, in an area of the sheet member 42 other than the contact portion 46 and downstream in the A direction, a contact area between the sheet member 42 and the sheet P increases, making it possible to stably support the sheet member 42.

Further, the length of the contact portion. 46 in the X direction is adjusted by changing the length of the notch portion 52 in the X direction with the fastener 62, making it possible to suppress the snagging of the sheet P without using a separate member that deforms the sheet member 42.

Third Exemplary Embodiment

Next, a stacker unit 70 of a third exemplary embodiment, which is an example of the accommodating device, will be described in detail with reference to the accompanying drawings. Note that portions common to the portions of the printer 10 according to the first exemplary embodiment are denoted by the same reference signs, and descriptions thereof will be omitted. Further, descriptions of actions and effects similar to those of the printer 10 of the first exemplary embodiment will also be omitted. Furthermore, descriptions of the configurations, actions, and effects similar to those e stacker unit 40 of the second exemplary embodiment will also be omitted.

Figure 10:
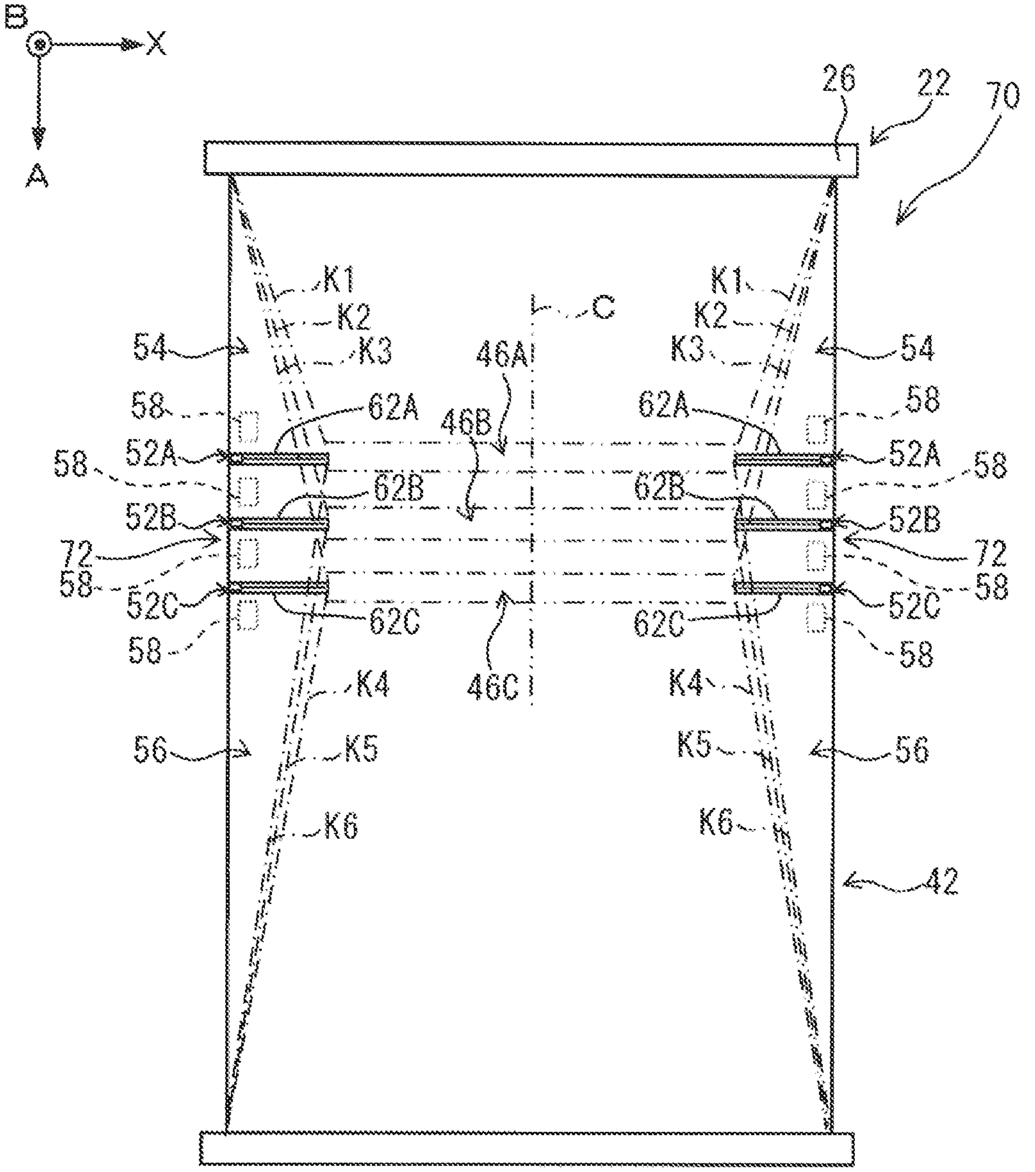
FIG. 10 is a schematic view illustrating a sheet member and a slide portion according to a third exemplary embodiment.

The stacker unit 70 is illustrated in FIG. 10. The stacker unit 70 is provided in the printer 10 (FIG. 1) in place of the stacker unit 20 (FIG. 1). Further, the stacker unit 70 is provided with two adjustment units 72 in place of the two adjustment units 50 (FIG. 7) of the stacker unit 40 (FIG. 7).

The two adjustment units 72 are, as an example, disposed linearly symmetrically with respect to the center line C of the sheet member 42. That is, the two adjustment units 72 have a similar configuration except for the arrangement and orientation of the members. Therefore, the adjustment unit 72 in the +X direction will be described, and the description of the adjustment unit 72 in the −X direction will he omitted.

The adjustment unit 72 includes three of the notch portion 52, the first adjustment unit 54, the second adjustment unit 56, four of the holding units 58, and three of the fasteners 62.

The three notch portions 52 are disposed at intervals in the +A direction at the end portion of the sheet member 42 in the +X direction. When the three notch portions 52 are to be differentiated, the notches 52 are referred to as notch portions 52A, 52B, 52C in order from upstream in the +A direction.

The four holding units 58 are respectively provided at the end portion of the sheet member 42 in the +X direction in tour areas divided by the three notch portions 52 in the +A direction.

One of the three fasteners 62 is provided in each of the three notch portions 52. In other words, a plurality of the fasteners 62 are provided to the sheet member 42 in the +A direction. When the three fasteners 62 are to be differentiated, the fasteners 62 are referred to as fasteners 62A, 62B, 62C in order from upstream in the A direction. When the sheet P of a normal size larger than the sheet PB and smaller than the sheet PA is used, the fastener 62B is in a disengaged state, and e fasteners 62A, 62C are in engage slates.

In the stacker unit 70, two of the three fasteners 62 are set in engaged states and one is set in a non-engaged state, form g e first adjustment unit 54 upstream in the +A direction and forming the second adjustment unit 56 downstream in the +A direction with respect o the fastener 62 in the non-engaged state.

That is, in the stacker unit 70, the position of the contact portion 46 can be changed in the +A direction in accordance with the sheet P by selecting the fastener 62 to be in the non-engaged state and having the first adjustment unit 54 and the second adjustment unit 56 held by the holding unit 58. Note that, when the three contact portions 46 are to be differentiated, the contact portions 46 are referred to as contact portions 46A, 46B, 46C in order from upstream in the +A direction.

Next, the action of the stacker unit 70 will be described.

The tip portion PS of the sheet PA tends to lower in the −Z direction from discharge start time compared to the tip portion PS of the sheet P of a normal size. In other words, the position reached by the tip portion PS of the sheet PA is likely positioned in the −A direction of the position reached by the tip portion PS of the sheet P of a normal size. Therefore, when the sheet PA is used, the fastener 62A (FIG. 10) is set to a non-engaged state, and the fasteners 62B, 62C (FIG. 10) are set to engaged states.

Figure 11:
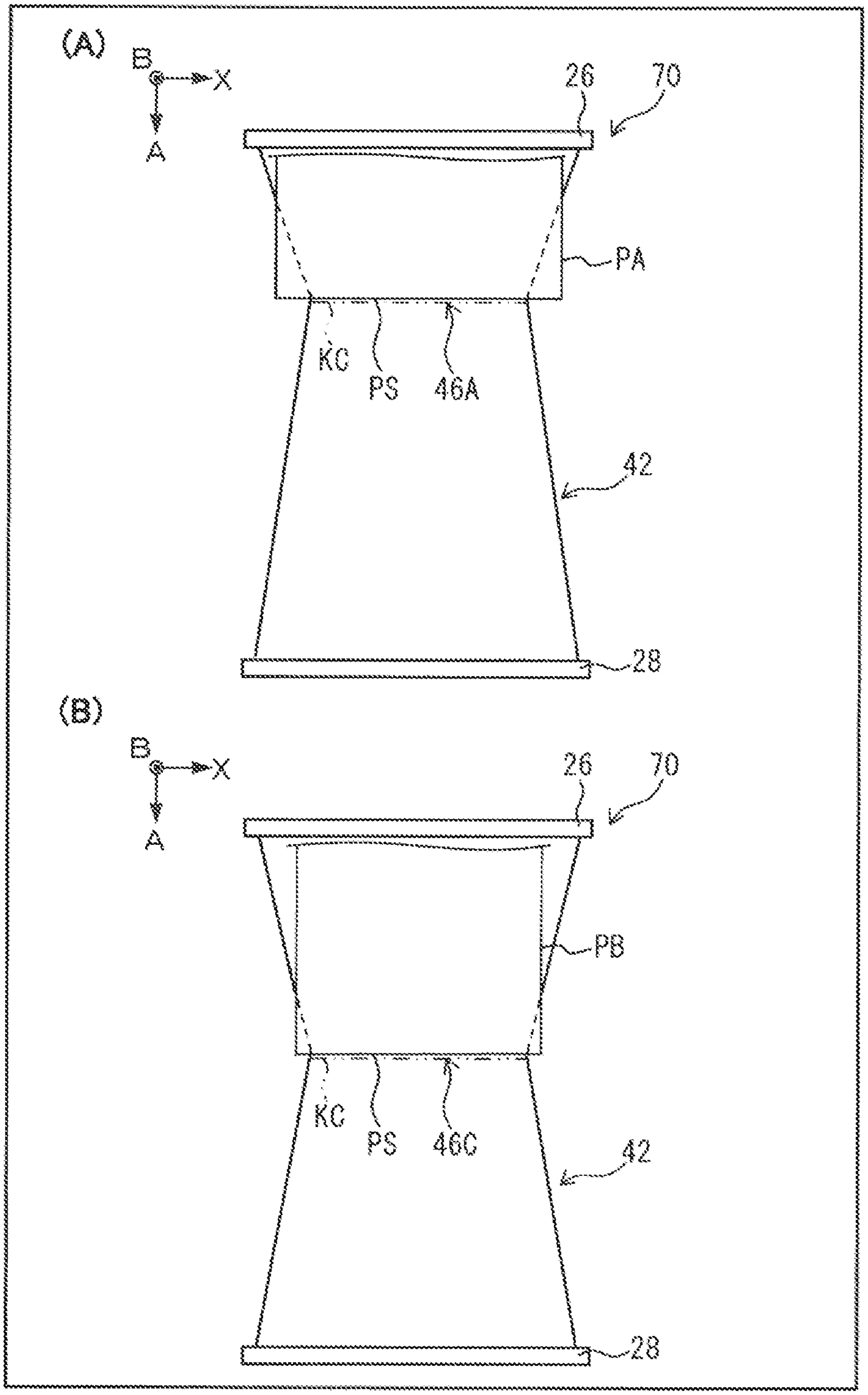
FIG. 11 includes schematic views (A) and (B) illustrating states in which tip portions of a sheet and another sheet are in contact with the contact portion of the sheet member of the third exemplary embodiment.

As illustrated in view (A) of FIG. 11, a central portion of the tip portion PS of the discharged sheet PA cones into contact with the contact portion 46A. On the other hand, both end portions of the tip portion PS in the X direction do not come into contact with the sheet member 42, and thus the snagging of the sheet PA can be suppressed.

Next, the tip portion PS of the sheet PB tends to not readily lower in the −Z direction compared to the tip portion PS of the sheet P of a normal size. In other words, the position reached by the tip portion PS of the sheet PB is likely positioned in the +A direction of the position reached by the tip portion PS of the sheet P of a normal size. Therefore, when the sheet PB is used, the fastener 62C (FIG. 10) is set to a non-engaged state, and the fasteners 62A, 62B (FIG. 10) are set to engaged states.

As illustrated in view (B) of FIG. 11, a central portion of the tip portion PS of the discharged sheet PB comes into contact with the contact portion 46C. On the other hand, both end portions of the tip portion PS in the X direction do not come into contact with the sheet member 42, and thus the snagging of the sheet PB can be suppressed.

Thus, according to the stacker unit 70, even if the contact position of the tip portion of the sheet P with respect to the sheet member 42 is shifted in the A direction due to a change in the size of the sheet P or the like, the length of the contact portion 46 in the X direction can be adjusted to match that of the sheet P by using the fastener 62 closest to the shifted position to make the adjustment. Thus, even if properties such as rigidity with respect to a force acting on the sheet P in the B direction changes, it is possible to suppress the snagging of the sheet P.

Fourth Exemplary Embodiment

Next, a stacker unit 80 of a fourth exemplary embodiment, which is an example of the accommodating device, will be described in detail with reference to the accompanying drawings. Note that portions common to the portions of the printer 10 according to the first exemplary embodiment are denoted by the same reference signs, and descriptions thereof will be omitted. Further, descriptions of actions and effects similar to those of the printer 10 of the first exemplary embodiment will also be omitted.

Figure 12:
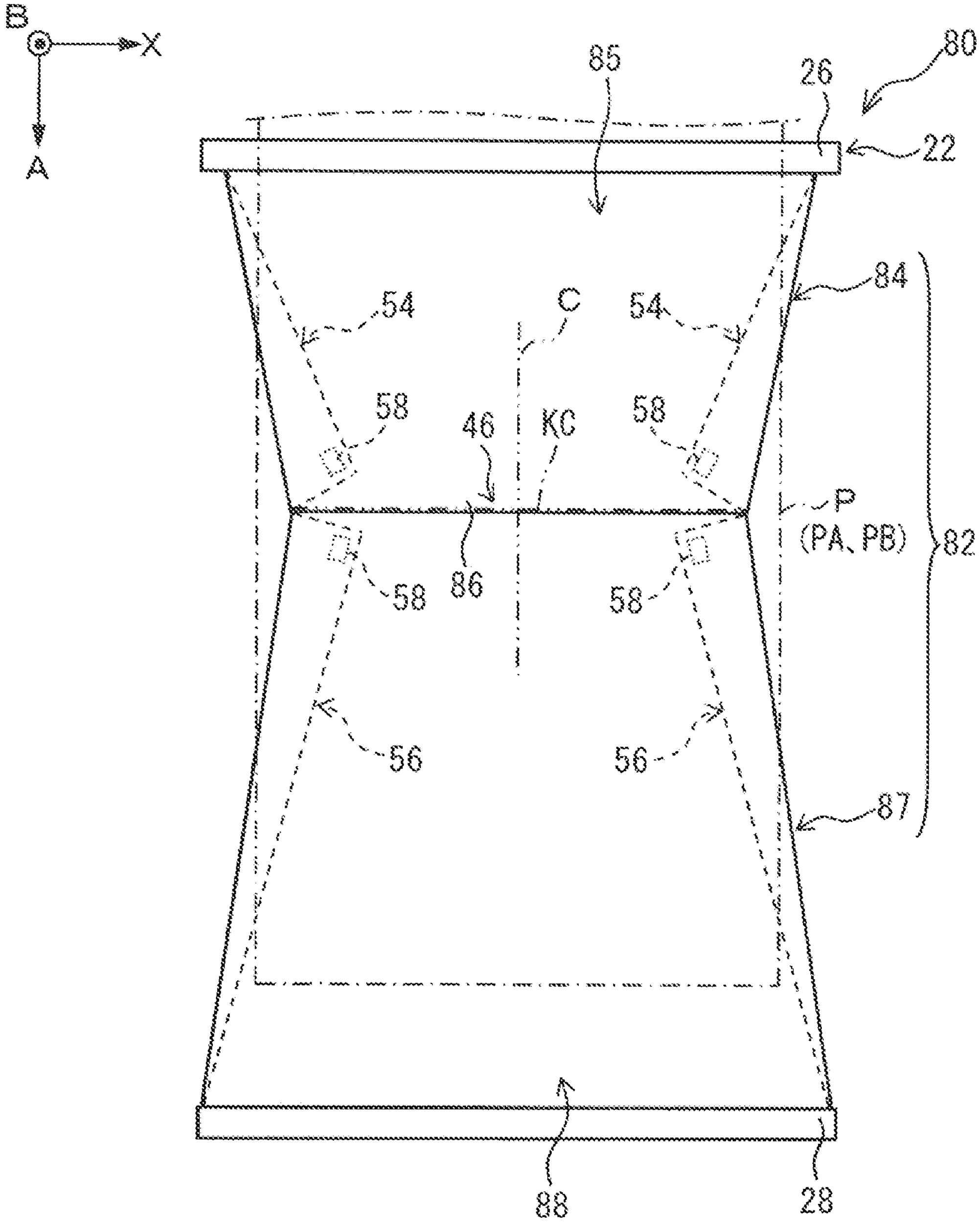
FIG. 12 is a schematic view illustrating an arrangement relationship between a sheet and both a sheet member and a slide portion according to a fourth exemplary embodiment.

The stacker unit 80 is illustrated in FIG. 12. The stacker unit 80 is provided in the printer 10 (FIG. 1) in place of the stacker unit 20 (FIG. 1). Further, the stacker unit 80 includes a sheet member 82, which is an example of the receiving member, and the support frame 22 configured to movably support the sheet member 82 in the X direction.

The sheet member 82 has a predetermined thickness in the B direction. Further, the sheet member 82 is constituted by, for example, a woven cloth or a non-woven cloth. Furthermore, the sheet member 82 has flexibility. Furthermore, the sheet member 82 includes a first receiving member 84 upstream and a second receiving member 87 downstream divided in the +A direction and including the contact portion 46.

The first receiving member 84 includes an upstream portion 85 formed into an isosceles trapezoidal shape in reverse orientation when viewed from the B direction, the two first adjustment units 54 integrally formed with one end portion and the other end portion of the upstream portion 85 in the X direction, and the holding unit 58.

The two first adjustment units 50 are disposed linearly symmetrically with respect to the center line C passing through a center of the first receiving member 84 in the X direction and extending in the A direction. Further, the two first adjustment units 54 each include the holding unit 58.

A length of the upstream portion 85 in the X direction gradually decreases from upstream to downstream in the +A direction. A length in the X direction of an upstream end of the upstream portion 85 in the +A direction is, as an example, longer than the length of the sheet PA in the X direction. Further, a length in the X direction of a downstream end portion 86 of the upstream portion 85 in the +A direction is shorter than the length of the sheet PB in the X direction. Then, when adjustment using the first adjustment unit 54 is not performed, the first receiving member 84 becomes a member having a quadrangular shape when viewed from the B direction. Further, when adjustment using the first adjustment unit 54 is performed and the first adjustment unit 54 is held by the holding unit 58, the first receiving member 84 becomes a member haying an isosceles trapezoidal shape in a reverse orientation when viewed from the B direction.

The second receiving member 87 includes a downstream portion 88 formed into an isosceles trapezoidal shape when viewed from the B direction, the two second adjustment units 56 integrally formed with one end portion and the other end portion of the downstream portion 88 in the X direction, and the two holding units 58.

The two second adjustment units 56 are disposed linearly symmetrically with respect to the center line C. Further, the two second adjustment units 56 each include the holding unit 58.

A length of the downstream portion 88 in the X direction gradually increases from upstream to downstream in the A direction. A length in the X direction of an upstream end portion 89 of the downstream portion 88 in the A direction is, as an example, shorter than the length of the sheet PA in the X direction. Further, a length in the X direction of a downstream end of the downstream portion 88 in the +A direction is longer than the length of the sheet PB in the X direction.

Then, when adjustment using the second adjustment unit 56 is not performed, the second receiving member 87 becomes a member having a quadrangular shape when viewed from the B direction. Further, when adjustment using the second adjustment unit 56 is performed and the second adjustment unit 56 is held by the holding unit 58, the second receiving member 87 becomes a member having an isosceles trapezoidal shape in a reverse orientation when viewed from the B direction.

Figure 13:
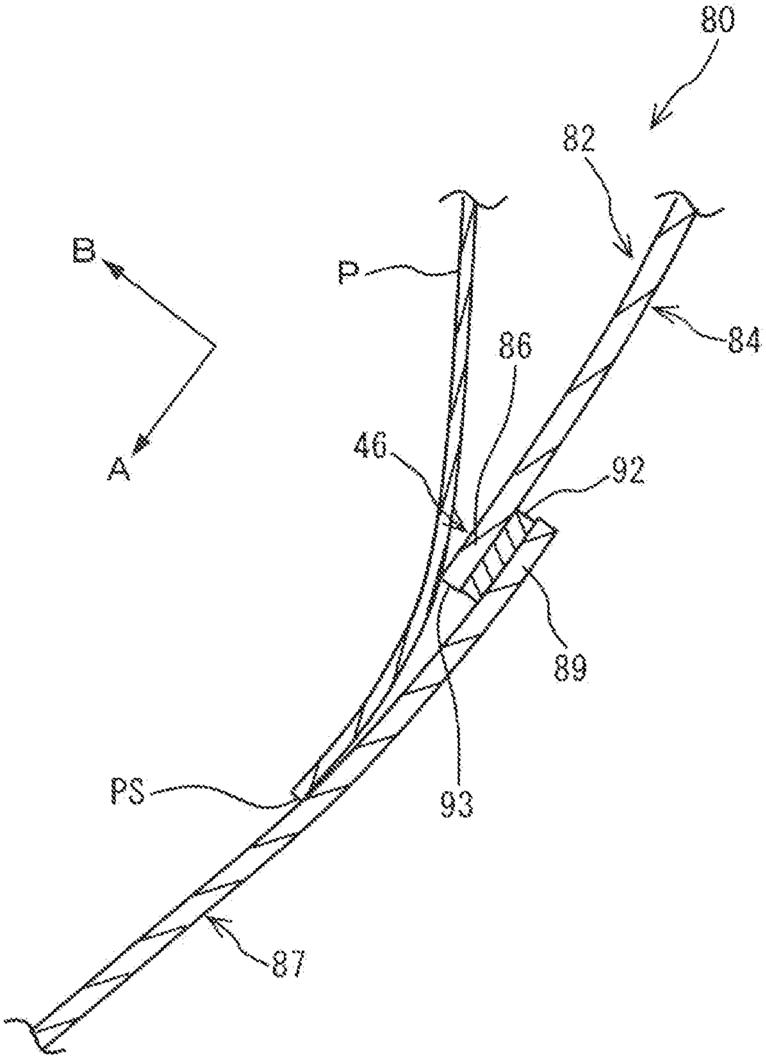
FIG. 13 is a vertical cross-sectional view illustrating a state after the sheet comes into contact with the contact portion of the fourth exemplary embodiment.

As illustrated in FIG. 13, the downstream end portion 86 overlaps the upstream end portion 89 in the B direction and is positioned between the upstream end portion 89 and the sheet P. The contact portion 46 is provided with a coupling and separation member 92.

The coupling and separation member 92 is, as an example, constituted by the Magictape (trade name) described above. Further, the coupling and separation member 92 is interposed between the downstream end portion 86 and the upstream end portion 89 in the B direction, and is configured to couple and separate at least a portion of the upstream end portion 89 and at least a portion of the downstream end portion 86 in the A direction and the B direction.

Thus, in the contact portion 46 of the sheet member 82, a step portion 93 is formed in which the second receiving member 87 is positioned in the −B direction with respect to the first receiving member 84. The length of the contact portion 46 in the X direction can be changed by adjusting the length in the X direction coupled by the coupling and separation member 92.

Next, the action of the stacker unit 80 will be described.

As illustrated in FIG. 12, the length of the contact portion 6 in the X direction is adjusted to the length of the sheet P in the X direction by the first adjustment unit 54 and the second adjustment unit 56. In this state, the first receiving member 84 and the second receiving member 87 are coupled by the coupling and separation member 92 (FIG. 13). Thus, the sheet member 82 is formed.

As illustrated in FIG. 13, the downstream end portion 86 of the first receiving member 84 is positioned in the +B direction with respect to the upstream end portion 89 of the second receiving member 87 and thus, when the tip portion sheet P in the direction comes into contact with the contact portion 46, the tip portion PS of the sheet P is moved am comes into contact with the second receiving member 87 without being snagged on the step portion 93.

According to the stacker unit 80, at least a portion of the upstream end portion 89 and a east a portion of the downstream end portion 86 can be coupled and separated in the A direction and the B direction by the coupling and separation member 92. Then, a portion where the first receiving member 84 and the second receiving member 87 are coupled by the coupling and separation member 92 becomes the contact portion 46. In this way, the length of the contact portion 46 in the X direction is changed by changing the length of the portion coupled by the coupling and separation member 92 in the X direction, making it possible to easily adjust the length of the contact portion 46 in the X direction.

Further, the second receiving member 87 positioned downstream of the contact portion 46 in the +A direction is disposed at a location farther from the sheet P than the first receiving member 84 and the coupling and separation member 92 in the B direction, making it possible to suppress the snagging of the sheet P that accompanies contact between the sheet P and the second receiving member 87.

Fifth Exemplary Embodiment

Next, a stacker unit 100 of a fifth exemplary embodiment, which is an example of the accommodating device, will be described in detail with reference to the accompanying drawings. Note that portions common to the portions of the printer 10 according to the first exemplary embodiment are denoted by the same reference signs, and descriptions thereof will be omitted. Further, descriptions of actions and effects similar to those of the printer 10 of the first exemplary embodiment will also be omitted.

Figure 14:
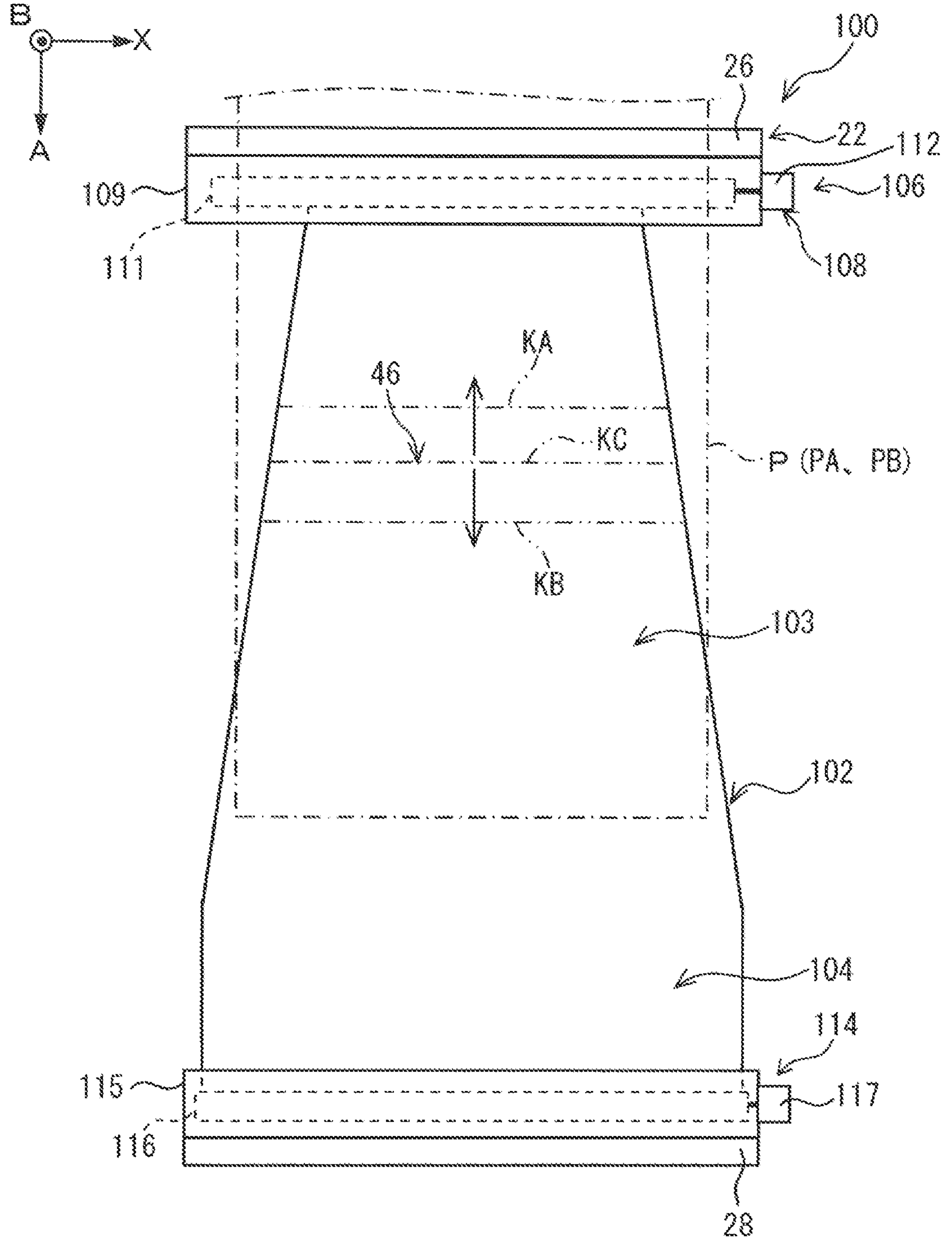
FIG. 14 is a schematic view illustrating a sheet member and a slide portion according to a fifth exemplary embodiment.

The stacker unit 100 is illustrated in FIG. 14. The stacker unit 100 is provided in the printer 10 (FIG. 1) in place of the stacker unit 20 (FIG. 1). Further, the stacker unit 100 includes a sheet member 102, which is an example of the receiving member, a winding unit 106, which is an example of the adjustment unit, and the support frame 22 configured to movably support the sheet member 102 and the winding unit 106 in the X direction.

The sheet member 102 has a predetermined thickness in the B direction. Further, the sheet member 102 is, for example, a long cloth constituted by a woven cloth, a non-woven cloth, or the like, having a length in the A direction longer than a length in the X direction. Furthermore, the sheet member 102 has flexibility. Specifically, the sheet member 102 includes, as an example, a trapezoidal portion 103 positioned upstream in the A direction, and a rectangular portion 104 positioned downstream of the trapezoidal portion 103.

The trapezoidal portion 103 is formed into an isosceles trapezoidal shape when viewed from the B direction. In other words, a length of the trapezoidal portion 103 in the X direction gradually increases from upstream to downstream in the +A direction. At both end portions of the trapezoidal portion 103 in the X direction, a downstream end in the +A direction is positioned outward of an upstream end in the X direction.

A length in the X direction of the downstream end of the trapezoidal portion 103 in the +A direction is, as an example, longer than the length of the sheet PA. Further, a length in the X direction of the upstream end of the trapezoidal portion 31 in the +A direction is shorter than the length of the sheet PB in the X direction. Note that the contact portion 46 where the sheet comes into contact with the sheet member 102 first is set in the trapezoidal portion 103. Thus, the sheet member 02 increases in length in the X direction from upstream to downstream in the +A direction.

The length of the rectangular portion 104 in the X direction, as an example, does not change in the A direction. Further, a length of the rectangular portion 104 in the X direction is longer than the length of the sheet PA.

The winding unit 106 is composed of a first winding unit 108 and a second winding unit 114.

The first winding unit 108 includes an accommodation case 109, a first winding roller 111, and a first motor 112.

A slit (not illustrated) that opens in the +A direction is formed in the accommodation case 109. Further, the accommodation case 109 is attached to the slide frame 26.

The first winding roller 111 is accommodated in the accommodation case 109 and rotatably supported about a central axis (not illustrated) in the X direction. An upstream end of the trapezoidal portion 103 in the +A direction is attached to a portion of an outer circumferential surface of the first winding roller 111. The trapezoidal portion 103 extends in the +A direction through the slit of the accommodation case 109.

The first motor 112 is driven and controlled by the control unit 18 (FIG. 1), and thus the first winding roller 111 is rotated in the winding direction or rotatable in a drawing direction.

The second winding unit 114 includes an accommodation case 115, a second winding roller 116, and a second motor 117.

A slit (not illustrated) that opens in the −A direction is formed in the accommodation case 115. Further, the accommodation case 115 is attached to the weight frame 28.

The second winding roller 116 is accommodated in the accommodation case 115 and rotatably supported about a central axis (not illustrated) in the X direction. A downstream end of the rectangular portion 104 in the +A direction is attached to a portion of an outer circumferential surface of the second winding roller 116. The rectangular portion 104 extends in the −A direction through the slit of the accommodation case 115.

The second motor 117 is driven and controlled by the control unit 18 (FIG. 1), and thus the second winding roller 116 is rotated in the winding direction or rotatable in the drawing direction.

Thus, the winding unit 106 is an example of the adjustment unit, and the position of the contact portion 46 of the sheet member 102. In the +A direction can be changed by winding the sheet member 102 in the +A direction or the −A direction.

Next, the action of the stacker unit 100 will be described.

Figure 15:
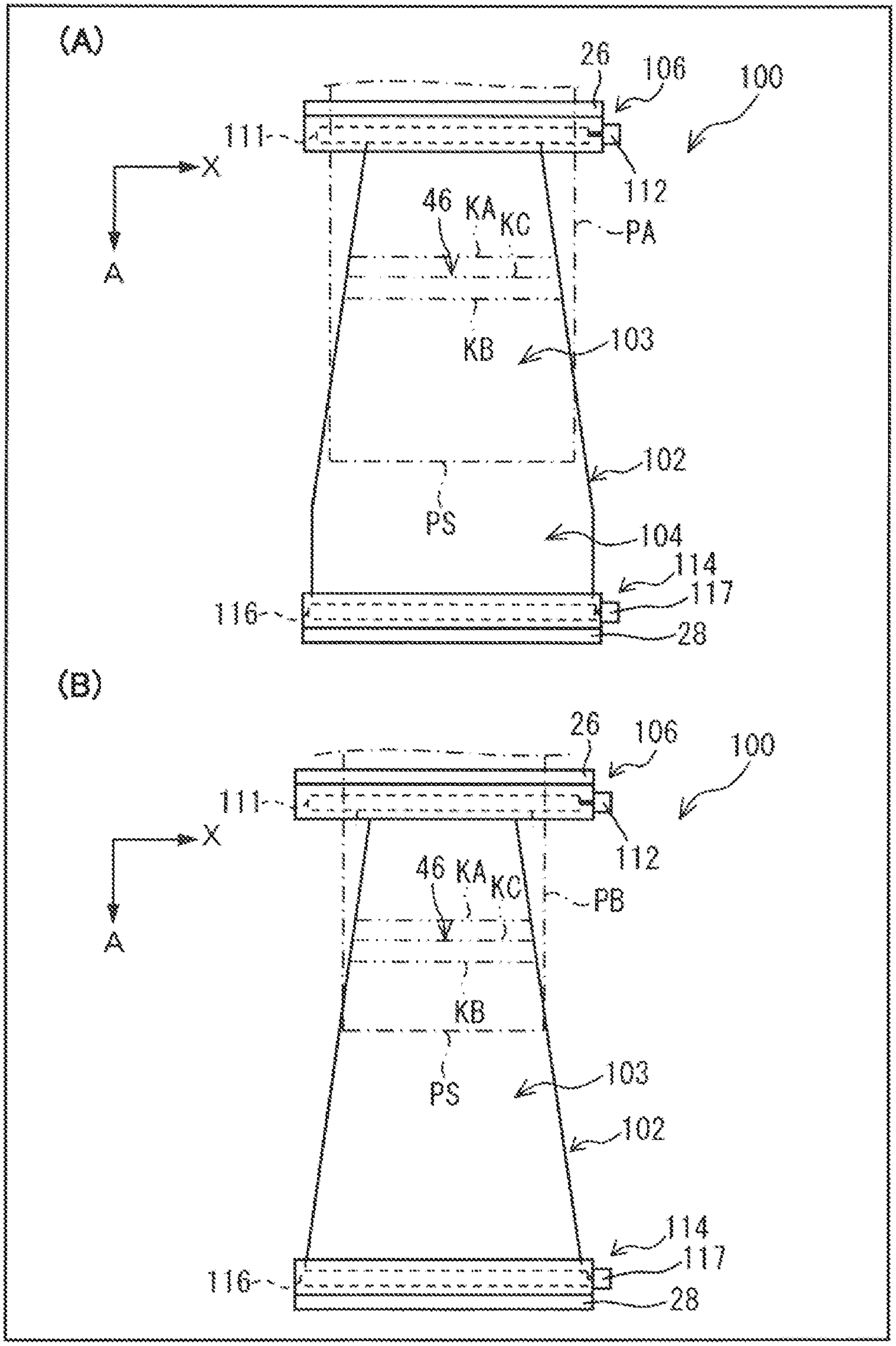
FIG. 15 includes schematic views (A) and (B) illustrating states in which tip portions of a sheet and another sheet are in contact with the contact portion of the sheet member of the fifth exemplary embodiment.

As illustrated in view (A) of FIG. 15, when the sheet PA is used, the first motor 112 is driven and the first winding roller 111 is rotated, thereby winding an upstream end portion of the trapezoidal portion 103 in the +A direction and drawing out a downstream end portion of the rectangular portion 104 in the +A direction. Thus, the position of the contact portion 46 in the A direction is moved in the −A direction with respect to the normal position. Then, when the tip portion PS of the discharged sheet PA reaches the contact portion 46, it is possible to suppress the snagging of both end portions of the sheet PA in the X direction on the sheet member 102.

As illustrated in view (B) of FIG. 15, when the sheet PB is used, the second motor 117 is driven and the second winding roller 116 is rotated, thereby winding the downstream end portion of the rectangular portion 104 (PIG. 14) in the +A direction and drawing out the upstream end portion of the trapezoidal portion 103 in the +A direction. Thus, the position of the contact portion 46 in the A direction is moved in the +A direction with respect to the normal position. Then, when the tip portion PS of the discharged sheet PA reaches the contact portion 46, it is possible to suppress the snagging of both end portions of the sheet PA in the X direction on the sheet member 102.

As described above, according to the stacker unit 100, the position of the contact. portion 46 in the A direction is changed by the winding unit 106 winding the sheet member 102 in the +A direction or the −A direction. Thus, even if the rigidity with respect to the force acting on the sheet P in the B direction changes or the like, causing the position where the tip portion of the sheet P comes into contact with the sheet member 102 first to be shifted in the +A direction or the −A direction, the snagging of the sheet P can be suppressed.

Further, according to the stacker unit 100, in the trapezoidal portion 103, the length of the sheet member 102 in the X direction differs in the A direction. Therefore, when the sheet member 102 is wound by the winding unit 106, not only is the position in the A direction of the area that becomes the contact portion 46 changed, but also the length in the X direction of the area that becomes the contact portion 46 is simultaneously changed.

Here, in a case in which another sheet P having a length in the X direction different from those of the sheets PA, PB is used, the position in the A direction and the length in the X direction of the contact portion 46 are changed simultaneously in accordance with the other sheet P, making it possible to make the task of adjusting the contact portion 46 easy compared to a configuration in which the position in the A direction and the length in the X direction of the contact portion 46 are separately changed.

Furthermore, the contact area between the sheet member 102 and the sheet P increases increasingly downstream in the +A direction, making it possible to stably support the sheet P downstream of the contact portion 46 in the +A direction.

The printer 10 and the stacker units 20, 40, 70, 80, 100 according to the first exemplary embodiment to the fifth exemplary embodiment of the present disclosure are based on the configurations described above. However, as a matter of course, modifications, omission, and the like may be made to a partial configuration without departing from the gist of the disclosure of the present application.

In the stacker unit 20, even if only one of the end portions of the contact portion 34 in the +X direction and the −X direction is positioned inward of the end portion of the sheet P in the X direction, snagging of the sheet P can be suppressed. The downstream portion of the contact portion 34 in the A direction may be positioned at substantially the same height as that of the upstream portion. The end portion of the sheet member 30 in the X direction and downstream of the contact portion 34 in the A direction may be positioned in the same position as the end portion of the sheet P in the X direction, or may be positioned inward of the end portion of the sheet P in the X direction. In the sheet member 30, in place of the oblique side portions 37, 38, a curved portion that is convex or concave in the X direction when viewed from the B direction may be formed. The support frame 22 may be secured to the housing 12 and the floor FL. Further, the support frame 22 may be configured as a linear slider and automatically moved in the X direction.

In the stacker unit 40, only one of the end portions of the contact portion 34 in the +X direction and the −X direction may be positioned inward of the end portion of the sheet P in the X direction. The downstream portion of the contact portion 46 in the A direction may he positioned at substantially the same height as that of the upstream portion. The end portion of the sheet member 42 in the X direction and downstream of the contact portion 46 in the A direction may be positioned in the same position as the end portion of the sheet P in the X direction or positioned inward of the end portion of the sheet P in the X direction.

The holding unit 58 is not limited to the Magictape (trade name), and, for example, a string attached to the two corner portions 55 may be pulled in the −B direction and tied.

In the sheet member 42, the length in the X direction may be increased increasingly from downstream in the +A direction toward the contact portion 46. Further, in the sheet member 42, in a case in which the length of the notch portion 52 in the X direction is to not be variable, the notch portion 52 may be formed by cutting only, without providing the fastener 62.

In the stacker unit 70, the number of notch portion 52 and fasteners 62 is not limited to three, and may be two or four or more.

In the stacker unit 80, the sheet member 82 is not limited to being divided into two sections in the A direction, and may be divided into three or more sections. Then, the contact portion 46 may be formed in accordance with the size of the sheet P.

In the stacker unit 100, the sheet member 102 may be slid in the A direction without being wound. The sheet member 102 may have the same or a decreasing length in the X direction from upstream to downstream in the +A direction. The winding unit 106 is not limited to a unit that automatically winds the sheet member 102, and the sheet member 102 may be manually wound by the user.

The sheet members 30, 42, 82, 102 are not limited to cloth, and may be flexible resin sheets.

For the printer 10, instead of the head unit 16 of a serial type, a line head may be used. Further, the printer 10 may include a recording unit of an electrophotographic type instead of the head unit 16. Furthermore, the printer 10 is not limited to a side resist system in which the sheet P is placed on one side in the X direction, and may he a center resist system in which the center of the device and the center of the sheet P in X direction are aligned.

What is claimed is:

1. An accommodating device provided with a receiving member having flexibility, the accommodating device being configured to receive in the receiving member a medium having a sheet shape and discharged from a discharge unit in a discharge direction, the receiving member including a contact portion with which the medium comes into contact, and in a width direction intersecting the discharge direction, at least one end portion of the contact portion being positioned inward of at least one end portion of the medium reaching the contact portion, wherein an end portion of the receiving member in the width direction and downstream of the contact portion in the discharge direction is positioned outward of an end portion of the medium in the width direction.

2. The accommodating device according to claim 1, wherein the contact portion is an area of the receiving member with which the medium comes into contact first.

3. The accommodating device according to claim 1, wherein both end portions of the contact portion in the width direction are positioned inward of both end portions of the medium in the width direction.

4. The accommodating device according to claim 1, wherein the contact portion is obliquely disposed with a downstream portion, in the discharge direction, of the contact portion positioned below an upstream portion, in the vertical direction, of the contact portion when viewed from the width direction.

5. The accommodating device according to claim 1, wherein the receiving member is provided with an adjustment unit configured to adjust a length of the contact portion in the width direction.

6. The accommodating device according to claim 5, wherein the adjustment unit is configured to adjust a length of the contact portion in the width direction, thereby positioning both end portions of the contact portion in the width direction inward of both end portions of the medium in the width direction.

7. The accommodating device according to claim 5, wherein the adjustment unit includes a notch portion cut from an end portion of the receiving member in the width direction toward a central portion, a first adjustment unit positioned upstream of the notch portion in the discharge direction in the receiving member, a second adjustment unit positioned downstream of the notch portion in the discharge direction in the receiving member, and a holding unit configured to hold the first adjustment unit and the second adjustment unit in a retracted state away from the medium.

8. The accommodating device according to claim 7, wherein in the retracted state, a length of the receiving member in the width direction decreases increasingly from upstream in the discharge direction toward the contact portion, and decreases increasingly from downstream in the discharge direction toward the contact portion.

9. The accommodating device according to claim 7, wherein the adjustment unit includes a changing member configured to change a length of the notch portion in the width direction.

10. The accommodating device according to claim 9, wherein a plurality of the changing members are provided to the receiving member in the discharge direction.

11. The accommodating device according to claim 5, wherein the receiving member includes a first receiving member upstream and a second receiving member downstream divided in the discharge direction and including the contact portion and the contact portion is provided with a coupling and separation member interposed between a downstream end portion of the first receiving member in the discharge direction and an upstream end portion of the second receiving member in the discharge direction, and configured to couple and separate at least a portion of the upstream end portion and at least a portion of the downstream end portion in the discharge direction.

12. The accommodating device according to claim 11, wherein the downstream end portion overlaps the upstream end portion in an intersecting direction intersecting both the discharge direction and the width direction, and is positioned between the upstream end portion and the medium and the coupling and separation member is interposed between the downstream end portion and the upstream end portion in the intersecting direction.

13. The accommodating device according to claim 5, wherein the adjustment unit is a winding unit configured to wind the receiving member in the discharge direction, thereby changing a position of the contact portion in the discharge direction.

14. The accommodating device according to claim 13, wherein the receiving member has a length in the width direction that increases from upstream to downstream in the discharge direction.

15. The accommodating device according to claim 1, further comprising:

a support portion configured to movably support the receiving member in the width direction, thereby positioning at least one end portion of the contact portion in the width direction inward of at least one end portion of the medium reaching the contact portion.

16. A recording device comprising:

a recording unit provided to a device main body and configured to perform recording on a medium; and the accommodating device according to claim 1 configured to receive the medium discharged from the device main body.

17. An accommodating device provided with a receiving member having flexibility, the accommodating device being configured to receive in the receiving member a medium having a sheet shape and discharged from a discharge unit in a discharge direction, the receiving member including a contact portion with which the medium comes into contact and in a width direction intersecting the discharge direction, at least one end portion of the contact portion being positioned inward of at least one end portion of the medium reaching the contact portion, wherein an oblique side portion extending downstream from a position of the contact portion in the discharge direction is positioned outward in the width direction with respect to the contact portion.

* * * * *